US012641332B2

(12) United States Patent
Wei et al.

(10) Patent No.: US 12,641,332 B2
(45) Date of Patent: May 26, 2026

(54) DRIVING STRUCTURE FOR USE IN OPTICAL ACTUATOR, CORRESPONDING PHOTOGRAPHING MODULE, AND ASSEMBLY METHOD

(71) Applicant: NINGBO SUNNY OPOTECH CO., LTD., Ningbo (CN)

(72) Inventors: Hangang Wei, Ningbo (CN); Dongli Yuan, Ningbo (CN); Qianglong Bian, Ningbo (CN); Hu Wu, Ningbo (CN); Jia Liu, Ningbo (CN); Jianhong Li, Ningbo (CN); Qiong Zhang, Ningbo (CN); Jianbin Huang, Ningbo (CN)

(73) Assignee: NINGBO SUNNY OPOTECH CO., LTD., Ningbo City (CN)

( * ) Notice: Subject to any disclaimer, the term of this patent is extended or adjusted under 35 U.S.C. 154(b) by 565 days.

(21) Appl. No.: 18/031,878

(22) PCT Filed: Oct. 13, 2021

(86) PCT No.: PCT/CN2021/123532
§ 371 (c)(1),
(2) Date: Oct. 13, 2023

(87) PCT Pub. No.: WO2022/078386
PCT Pub. Date: Apr. 21, 2022

(65) Prior Publication Data
US 2024/0276088 A1 Aug. 15, 2024

(30) Foreign Application Priority Data

Oct. 14, 2020 (CN) .......................... 202011097162.3
Oct. 30, 2020 (CN) .......................... 202011191352.1

(51) Int. Cl.
H04N 23/55 (2023.01)
G03B 5/02 (2021.01)
H04N 23/68 (2023.01)

(52) U.S. Cl.
CPC ............... *H04N 23/55* (2023.01); *G03B 5/02* (2013.01); *H04N 23/687* (2023.01); *G03B 2205/0015* (2013.01); *G03B 2205/0084* (2013.01)

(58) Field of Classification Search
CPC ........ H04N 23/55; H04N 23/54; H04N 23/57; H04N 23/58; H04N 23/68; H04N 23/682;
(Continued)

(56) References Cited

U.S. PATENT DOCUMENTS

2008/0129831 A1 6/2008 Cho et al.
2009/0262425 A1 10/2009 Kimura
(Continued)

FOREIGN PATENT DOCUMENTS

AU 2018100438 A4 5/2018
CN 104204889 A 12/2014
(Continued)

*Primary Examiner* — Bumsuk Won
*Assistant Examiner* — Seth D Moser
(74) *Attorney, Agent, or Firm* — Che-Yang Chen

(57) ABSTRACT

The present invention relates to a driving structure for use in an optical actuator, including: a first driving part, which is suitable for mounting a lens and driving the lens to move transversely in the x-axis and y-axis directions; and a second driving part, which is suitable for driving a photosensitive chip to move transversely in the x-axis and y-axis directions, where the lens and the photosensitive chip are configured to be driven simultaneously and to move in opposite directions. Also provided in the present invention are a corresponding photographing method, an optically stabilizing photographing module, and a corresponding assembly method. The
(Continued)

present application increases the stabilization travel and the stabilization response speed of the photographing module.

23 Claims, 16 Drawing Sheets

(58) Field of Classification Search
CPC .. H04N 23/683; H04N 23/685; H04N 23/687; H04N 23/6812; G03B 5/00; G03B 5/02; G03B 5/04; G03B 2205/0015; G03B 2205/0007; G03B 2205/0038; G03B 2205/0053; G03B 2205/0084; G03B 2205/0069; G02B 27/646
USPC ................................................. 359/554, 557
See application file for complete search history.

(56) References Cited

U.S. PATENT DOCUMENTS

| | | | |
|---|---|---|---|
| 2009/0263116 A1 | 10/2009 | Saito | |
| 2010/0208089 A1 | 8/2010 | Chang | |
| 2014/0099088 A1 | 4/2014 | Katano | |
| 2017/0289457 A1* | 10/2017 | Hu | H02K 33/02 |
| 2019/0141246 A1* | 5/2019 | Sugita | G03B 5/00 |
| 2020/0084358 A1* | 3/2020 | Nadamoto | H04N 23/6812 |
| 2020/0162674 A1* | 5/2020 | Ito | G03B 5/00 |
| 2021/0195110 A1* | 6/2021 | Ino | H04N 23/67 |
| 2022/0103753 A1* | 3/2022 | Kojima | H04N 25/61 |
| 2024/0022816 A1* | 1/2024 | Yuan | H04N 23/54 |
| 2024/0040257 A1* | 2/2024 | Yang | G02B 7/023 |
| 2025/0039525 A1* | 1/2025 | Park | H04N 23/55 |

FOREIGN PATENT DOCUMENTS

| | | | |
|---|---|---|---|
| CN | 105573014 A | 5/2016 | |
| CN | 106559611 A | 4/2017 | |
| CN | 107277304 A | 10/2017 | |
| CN | 108174079 A | 6/2018 | |
| CN | 209402560 U | 9/2019 | |
| CN | 110554474 A | 12/2019 | |
| CN | 110673297 A | 1/2020 | |
| CN | 209982579 U | 1/2020 | |
| CN | 110784650 A | 2/2020 | |
| CN | 210781015 U | 6/2020 | |
| CN | 111405186 A | 7/2020 | |
| CN | 111510607 A | 8/2020 | |
| CN | 211266959 U | 8/2020 | |
| CN | 111698352 A | 9/2020 | |
| CN | 111953881 A | 11/2020 | |
| CN | 112616001 A | 4/2021 | |
| JP | 2006133740 A | 5/2006 | |
| WO | 2018103105 A1 | 6/2018 | |
| WO | 2020004975 A1 | 1/2020 | |
| WO | 2020029781 A1 | 2/2020 | |
| WO | 2020179832 A1 | 9/2020 | |

* cited by examiner

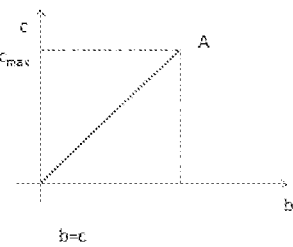
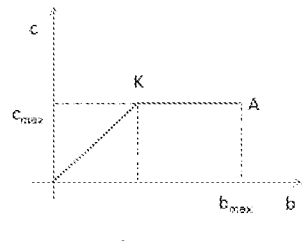
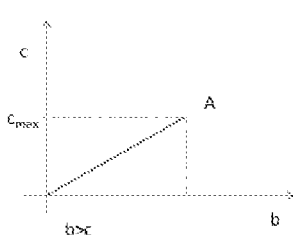
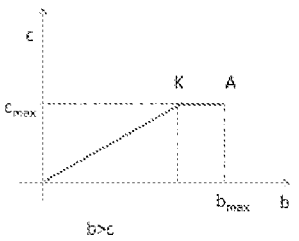
FIG.4
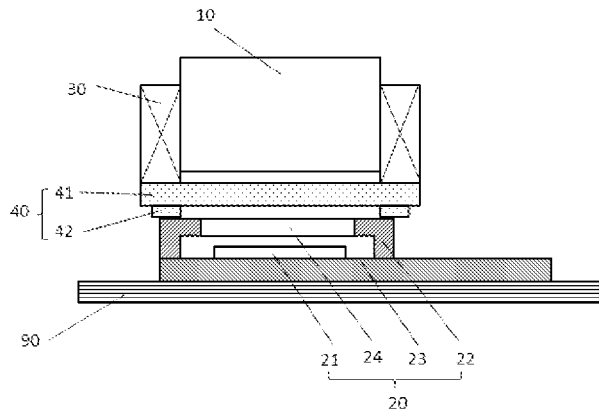
FIG.5
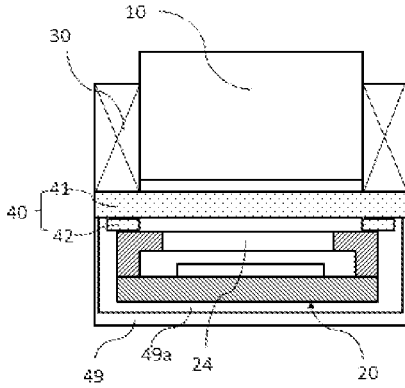
FIG.6

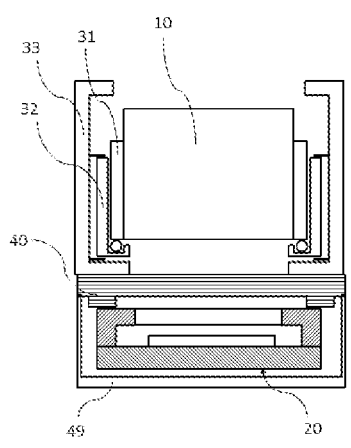
FIG.7
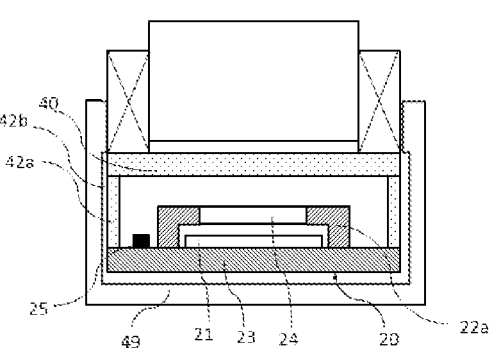
FIG.8
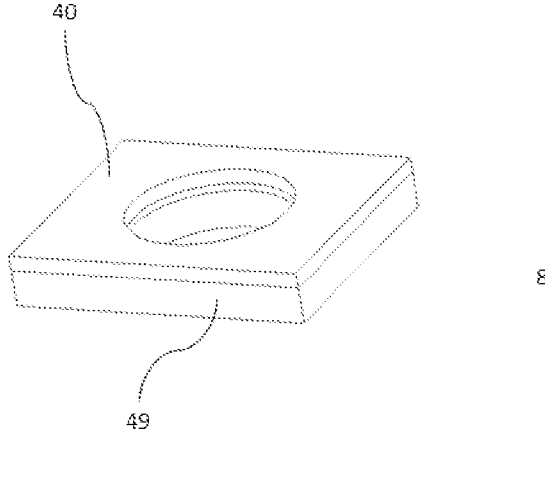
FIG.9a
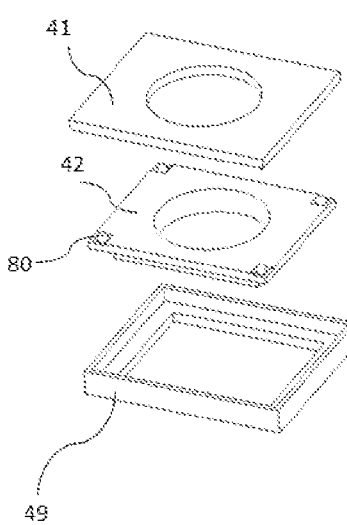
FIG.9b

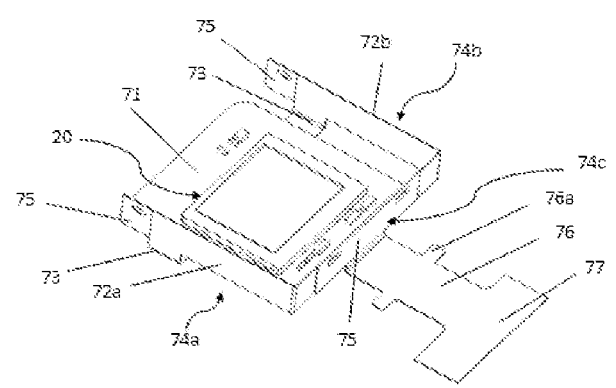
FIG.20
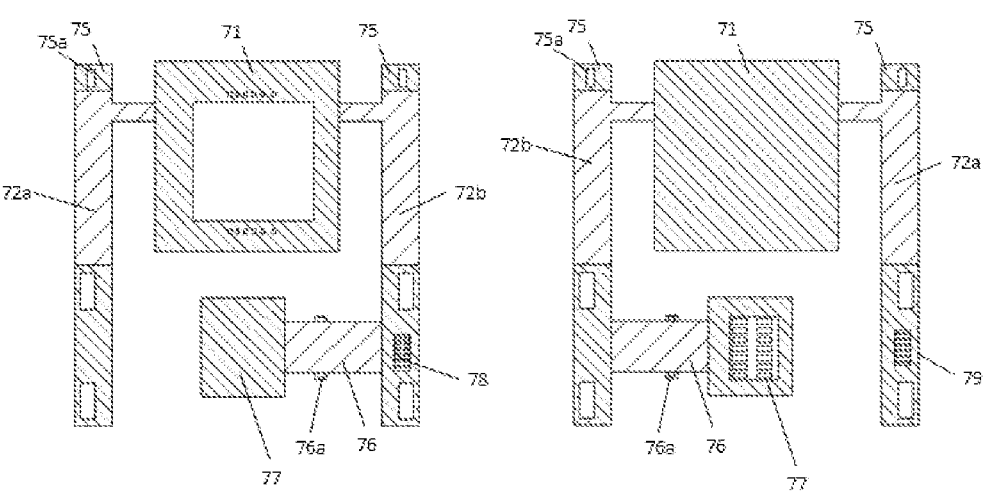
FIG.21a                    FIG.21b
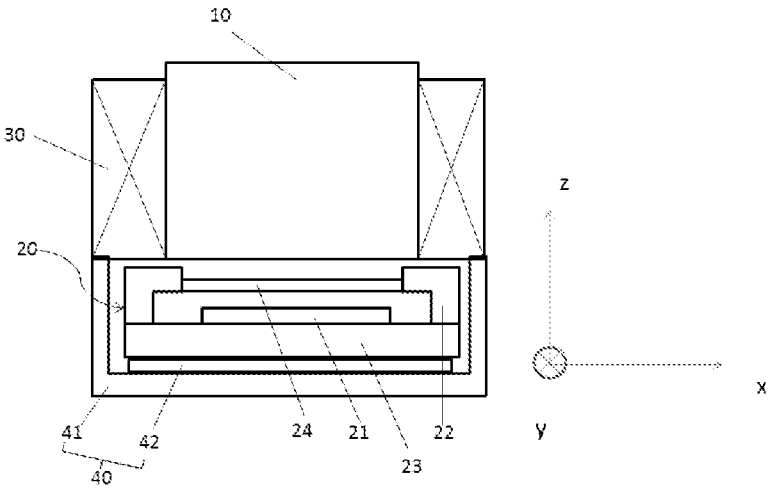
FIG.22

FIG.25                                              FIG.26

DRIVING STRUCTURE FOR USE IN OPTICAL ACTUATOR, CORRESPONDING PHOTOGRAPHING MODULE, AND ASSEMBLY METHOD

CROSS REFERENCE OF RELATED APPLICATION

This is a U.S. National Stage under 35 U.S.C. 371 of the International Application Number PCT/CN2021/123532, filed Oct. 13, 2021, which claims priority under 35 U.S.C. 119(a-d) to China patent application entitled "Driving Structure for Optical Actuator and Corresponding Camera Module", filed Oct. 14, 2020, application number 202011097162.3; and China patent application entitled "Optical Image Stabilization Camera Module", filed Oct. 30, 2020, application number 202011191352.1, which are incorporated herewith by references in their entities. The following divisional applications are also incorporated by references in their entities in the International Application Number PCT/CN2021/123532: China divisional patent application entitled "Driving Structure for Optical Actuator and Corresponding Camera Module", filed Dec. 11, 2020, application number 202011440069.8; China divisional patent application entitled "Driving Structure for Optical Actuator and Corresponding Camera Module", filed Dec. 11, 2020, application number 202011440068.3; China divisional patent application entitled "Driving Structure for Optical Actuator and Corresponding Camera Module", filed Dec. 11, 2020, application number 202011440056.0; China divisional patent application entitled "Driving Structure for Optical Actuator and Corresponding Camera Module", filed Dec. 11, 2020, application number 202011440053.7; China divisional patent application entitled "Driving Structure for Optical Actuator and Corresponding Camera Module", filed Dec. 11, 2020, application number 202011449524.0; China divisional patent application entitled "Driving Structure for Optical Actuator and Corresponding Camera Module", filed Dec. 11, 2020, application number 202011449531.0; China divisional patent application entitled "Driving Structure for Optical Actuator and Corresponding Camera Module", filed Dec. 11, 2020, application number 202011440028.9; China divisional patent application entitled "Optical Image Stabilization Camera Module", filed Dec. 11, 2020, application number 202011449522.1; China divisional patent application entitled "Optical Image Stabilization Camera Module and assembly method thereof", filed Dec. 11, 2020, application number 202011440026.X; China divisional patent application entitled "Optical Image Stabilization Camera Module", filed Dec. 11, 2020, application number 202011449519.X; and China divisional patent application entitled "Optical Image Stabilization Camera Module and assembly method thereof", filed Dec. 11, 2020, application number 202011440011.3.

BACKGROUND OF THE PRESENT INVENTION

Field of Invention

The present invention relates to the technical field of camera equipment, in particular, the present invention relates to a driving structure for an optical actuator, a corresponding camera module and an assembly method.

Description of Related Arts

With the increasing demand of consumers for mobile phone photography, the functions of mobile phone cameras (i.e. camera modules) are becoming more and more abundant. Functions such as portrait shooting, telephoto shooting, optical zoom, and optical image stabilization are all integrated into the camera while its volume size is limited, and functions such as autofocus, optical image stabilization, and optical zoom often need to rely on optical actuators (sometimes also called motors) to achieve.

FIG. 1 shows a typical conventional camera module with a motor. Referring to FIG. 1, the camera module generally comprises a lens 1, a motor mechanism 2 (referred to as a motor for short) and a photosensitive assembly 3. When the camera module is in the shooting state, the light from the object to be photographed is focused on the photosensitive element 3a of the photosensitive assembly 3 through the lens 1. Structurally, the lens 1 is fixed on the motor carrier of the motor (shown specifically in FIG. 1), the motor carrier is a movable portion, and it can usually drive the lens 1 in the direction of the optical axis under the action of the driving element of the motor to move up for focus function. However, for a camera module with an optical image stabilization (OIS) function, its motor often has a more complex structure. This is because that the motor needs to drive the lens 1 to move in other degrees of freedom (such as a direction perpendicular to the optical axis) in addition to driving the lens to move in the direction of the optical axis to compensate for shaking during shooting. Generally speaking, the shaking of the camera module comprises translation in the direction perpendicular to the optical axis (translation in the direction of the x-axis and y-axis) and rotation (referring to the rotation in the xoy plane, and the direction of the rotation axis can be substantially the same as the optical axis), and inclined shaking (referring to the rotation around the x and y axes, in the field of camera modules, inclined shaking is also called tilt). When the gyroscope (or other position sensing elements) in the module detects shaking in a certain direction, it can send a command to make the motor drive the lens to move a distance along the opposite direction, thereby compensating for the shaking of the lens. Generally speaking, the lens only translates and/or rotates in the direction perpendicular to the optical axis to compensate for the shaking of the camera module. This is because if the lens is rotated around the x and y axes, that is, if the lens is adjusted by tilt, the optical image stabilization effect may lead to a decrease in the imaging quality of the module, and even cause blurring, which makes it difficult to meet the basic imaging quality requirements.

However, as the image quality requirements of mobile phone camera modules are getting higher and higher, the volume and weight of the lens are getting larger and larger, and the driving force requirements for the motor are also getting higher and higher. However, current electronic devices (such as mobile phones) also have a great limitation on the volume of the camera module, and the volume occupied by the motor increases correspondingly with the increase of the lens. In other words, with the trend of lenses becoming larger and heavier, it is difficult for the driving force provided by the motor to increase accordingly. Under the premise that the driving force is limited, the heavier the lens, the shorter the motor can drive the lens to move, which affects the optical image stabilization capability. On the other hand, the heavier the lens, the slower the motor can drive the lens to move, and the longer it takes for the lens to reach the predetermined compensation position, which will also affect the optical image stabilization effect.

Therefore, there is an urgent need for a solution that can improve the optical image stabilization stroke and optical image stabilization response speed of the camera module.

SUMMARY OF THE PRESENT INVENTION

An object of the present invention is to overcome the shortcomings of the prior art and to provide a solution which is able to increase an optical image stabilization stroke and an optical image stabilization responding speed of the camera module.

In order to solve the above technical problem, the present invention provides riving structure for an optical actuator, comprising: a first driving part arranged for mounting a lens and driving the lens to translate in the directions of the x-axis and the y-axis; and a second driving part which is arranged for driving a photosensitive chip to translate in the x-axis and y-axis directions, wherein the lens and the photosensitive chip are configured to be driven simultaneously and move in opposite directions.

Wherein the second driving part is arranged for being installed with a photosensitive assembly which comprises the photosensitive chip, and the second driving part drives the photosensitive assembly to move to realize the translation of the photosensitive chip in the x-axis and y-axis directions.

Wherein the second driving part is further used to drive the photosensitive chip to rotate in the xoy plane.

Wherein based on a detected tilt and shaking angle a of a camera module, a lens movement distance of the lens which is driven by the first driving part is determined as b, and a movement distance of the photosensitive chip driven by the second driving part is determined as c, wherein the movement distance b of the lens, the movement distance c of the photosensitive chip, and an image focal length f of the camera module satisfy the following equation: $a=\arctan(b/f)+\arctan(c/f)$.

Wherein the driving structure further comprises a driving logic module which is used to keep a ratio between the movement distance b of the lens and the movement distance c of the photosensitive chip remain at a preset fixed ratio.

Wherein the driving structure further comprises a driving logic module having an anti-shake threshold K, wherein the driving logic module is arranged to keep a ratio between the movement distance b of the lens and the movement distance c of the photosensitive chip remain at a preset fixed ratio when the tilt shaking angle a is less than or equal to the anti-shake threshold K, and to allow the movement distance c of the photosensitive chip reaches the maximum value $c_{max}$ of a moving stroke when the tilt shaking angle a is greater than the anti-shake threshold K, and the movement distance b of the lens is calculated according to the following relationship equation: $b=\tan(a/f)-c_{max}$.

Wherein the preset fixed ratio of the movement distance of the lens to the movement distance of the photosensitive chip is set based on a weight of the lens, a driving force of the first driving part, a weight of the photosensitive chip or the photosensitive assembly, and a driving force of the second driving part, so as to allow the time for the lens and the photosensitive chip to move to the respective optical image stabilization target positions be the same.

Wherein the first driving part comprises a first base portion and a first movable portion, and the second driving part comprises a second base portion and a second movable portion, wherein the second base portion is fixed with the first base portion, and the second movable portion is located below the second base portion and is movably connected to the second base portion, wherein the photosensitive assembly is located below the second movable portion and fixed to the second movable portion.

Wherein the second movable portion is movably connected with the second base portion through a ball, so as to provide ball-based suspension system to restrict a degree of freedom of movement of the second movable portion with respect to the second base portion within the xoy plane.

Wherein in a top view angle, a plurality of the balls are arranged at four corners of the second driving part.

Wherein the driving structure further comprises a rear shell located below the second driving part, wherein the rear shell is connected to the second base to form an accommodating chamber, wherein the second movable portion and the photosensitive assembly are located in the accommodating chamber, wherein a gap is formed between the photosensitive assembly and a bottom of the rear shell.

Wherein the second movable portion comprises an extending arm which is extending downward, wherein the extending arm is bonded to a circuit board of the photosensitive assembly, wherein the extension arm is provided with an FPC which is welded to the circuit board.

Wherein centers of the second movable portion and the second base portion both have light holes.

Wherein the second base portion comprises a base and a cover, and the cover comprises a side wall extended downward from the base to surround the second movable portion and a supporting platform formed by extending horizontally inward from the side wall.

Wherein the ball and an edge region of the second movable portion are clamped between the base and the supporting platform.

Wherein an upper surface of the second base portion has a stepped structure, and the stepped structure comprises a first stepped surface on an outside and a second stepped surface on an inside, wherein a height of the second stepped surface is lower than a height of the first stepped surface.

Wherein an upper surface of an edge region of the second movable portion has a groove, and the ball is placed in the groove.

Wherein an upper surface of an edge region of the second movable portion has a concave step which comprises an outer step surface and an inner step surface, and the outer step surface of the concave step is lower than the inner step surface, wherein the concave step together with the side wall of the cover and the base form a receiving chamber for receiving the ball.

Wherein the ball is located between the supporting platform and the second movable portion.

Wherein a layer of the ball is provided between the base and the second movable portion, while another layer of the ball is provided between the second movable portion and the supporting platform.

Wherein the second movable portion has a clamping groove indented from an outer surface thereof, and the supporting platform is fitted into the clamping groove.

Wherein a glue is disposed between a lower end surface of the second movable portion and an upper end surface of a lens holder of the photosensitive assembly, and the glue avoid four corners of the second movable portion.

Wherein the second driving part comprises a driving element which is a coil-magnet assembly which comprises a magnet arranged on an edge region of the second base portion, and a coil arranged on an edge region of the second base portion; or the coil and the magnet are respectively arranged on side walls of the second movable portion and the second base portion.

Wherein the coil-magnet assembly comprises a first coil magnet pair, a second coil magnet pair and a third coil magnet pair, wherein the first coil magnet pair and the second coil magnet pair are used to provide a driving force in the x-axis direction, the third coil magnet pair is used to provide a driving force in the y-axis direction, wherein in a top view angle, the first coil magnet pair and the second coil magnet pair are respectively arranged along a first side and a second side of the second driving part, wherein the first side and the second side do not intersect, the second coil magnet pair is arranged along a third side of the second driving part, and the third side intersects with both the first side and the second side.

According to another aspect of the present invention, the present invention further provides a camera module, comprising a lens; a photosensitive assembly; and a driving structure for an optical actuator according to anyone of the above mentioned structure, wherein the lens is installed on the first driving part, and the photosensitive assembly is installed on the second driving part.

Wherein the photosensitive assembly comprises a circuit board, and the camera module further comprises a first connecting band and a second connecting band, and the first connecting band is arranged on a top area of the first driving part and is electrically connected to the first driving part, and the second connecting band is connected and conducted with the circuit board of the photosensitive assembly, wherein the second connecting band is provided with multiple bends to form a curved stacked shape.

Wherein the first driving part comprises a first base portion and a first movable portion, and the second driving part comprises a second base portion and a second movable portion, wherein the second base portion is fixed with the first base portion, the second movable portion is located below the second base portion and is movably connected with the second base portion, and the photosensitive assembly is located below the second movable portion and fixed to the second movable portion; wherein the photosensitive assembly comprises a suspended circuit board which comprises a rigid circuit board body and flexible connecting bands, and the connecting bands are extended from a first side and a second side of the circuit board body and bent upward to form bent parts, and a top of the bent part extends along a periphery of the photosensitive assembly in a horizontal direction, so that the connecting bands surround the first side, the second side and the third side of the photosensitive assembly, wherein each of the connecting bands located on the first side, the second side and the third side comprises at least one suspending portion which is fixed to the second base portion of the second driving part, or is fixed to the second base portion through an intermediary, wherein the photosensitive assembly has a first side and a second side consistent with the position of the circuit board body, and the first side and the second side are arranged oppositely, and the third side intersects both the first side and the second side.

Wherein the suspending portion has a suspension hole, the second base portion or the intermediary has a hook which is engaged with the suspension hole.

Wherein a part of each connecting band is attached with a rigid substrate for reinforcement, so as to form the suspending portion.

Wherein the suspended circuit board is made of a rigid-flex board, wherein the circuit board body and the suspending portion are made of a rigid board of the rigid-flex board, the bending portion and the connecting band section connected between the plurality of suspending portions are formed by the flexible board part of the rigid-flex board.

Wherein the connecting bands comprises a third connecting band and a fourth connecting band, wherein the third connecting band is extending from the first side of the circuit board body and bent upward to form a bending portion, then extending along the first side of the photosensitive assembly, and bending in the horizontal direction at the corner and continuing to extend along the third side, wherein the fourth connection band is extending from the second side of the circuit board body and bent upward to form another bending portion, then extending along the second side of the photosensitive assembly, and bending horizontally at the corner and continuing extending along the third side, wherein the third connecting band and the fourth connecting band are joined at the third side and conducted with each other.

Wherein a fifth connecting band is connected to the suspending portion of the connecting band located at the third side, and the fifth connecting band comprises a connector for being connected with outside, wherein the suspended circuit board also comprises a fixing portion for fixing the fifth connecting band.

According to another aspect of the present invention, the present invention further provides an optical image stabilization camera module, comprising a lens, a photosensitive assembly comprising a photosensitive chip; a first driving part arranged for mounting the lens and driving the lens to translate in the x-axis and the y-axis directions; and a second driving part arranged for driving the photosensitive chip to translate in the x-axis and the y-axis directions, wherein the second driving part comprises a base and a cover, the base is located below the photosensitive assembly, and a top of the cover is connected to the base, and a top of the cover is connected to the first driving part, wherein the lens and the photosensitive chip are configured to be driven simultaneously and move in opposite directions.

Wherein the second driving part is further arranged to drive the photosensitive chip to rotate in the xoy plane.

Wherein based on a detected tilt shaking angle a of the camera module, a lens movement distance of the lens which is driven by the first driving part is determined as b, and a movement distance of the photosensitive chip driven by the second driving part is determined as c, wherein the movement distance b of the lens, the movement distance c of the photosensitive chip, and an image focal length f of the camera module satisfy the following equation: $a=\arctan(b/f)+\arctan(c/f)$.

Wherein the driving structure further comprises a driving logic module which is used to keep a ratio between the movement distance b of the lens and the movement distance c of the photosensitive chip remain at a preset fixed ratio.

Wherein the driving structure further comprises a driving logic module having an anti-shake threshold K, wherein the driving logic module is arranged to keep a ratio between the movement distance b of the lens and the movement distance c of the photosensitive chip remain at a preset fixed ratio when the tilt shaking angle a is less than or equal to the anti-shake threshold K, and to allow the movement distance c of the photosensitive chip reaches the maximum value $c_{max}$ of a moving stroke when the tilt shaking angle a is greater than the anti-shake threshold K, and the movement distance b of the lens is calculated according to the following relationship equation: $b=\tan(a/f)-c_{max}$.

Wherein the preset fixed ratio of the movement distance of the lens to the movement distance of the photosensitive chip is set based on a weight of the lens, a driving force of the first driving part, a weight of the photosensitive chip or the photosensitive assembly, and a driving force of the second driving part, so as to allow the time for the lens and the photosensitive chip to move to the respective optical image stabilization target positions be the same.

Wherein the first driving part comprises a first base portion and a first movable portion, and the second driving part comprises a second base portion and a second movable portion, wherein the second base portion comprise a base and a cover, wherein a top of the cover is fixed with the first base portion, and the second movable portion is located above the base and is movably connected to the second base portion, wherein the photosensitive assembly is located above an upper surface of the second movable portion.

Wherein the second movable portion is movably connected with the second base portion through a ball, wherein an upper surface of the second base portion, the ball and a lower surface of the second movable portion is supported in the z-axis direction in sequence, so as to restrict a degree of freedom of movement of the second movable portion with respect to the second base portion within the xoy plane, wherein the z-axis is vertical to the xoy plane.

Wherein in a top view angle, a plurality of the balls are arranged at four corners of the second driving part.

Wherein the second base portion is provided with at least three grooves, and at least three the balls are arranged in the at least three grooves, so as to support the second movable portion in the xoy plane.

Wherein the base comprises a base plate, and the balls are arranged on an edge area of the base plate.

Wherein the second movable portion comprises a movable portion bottom plate and a movable portion side wall upwardly extended from an edge area of the movable portion bottom plate, wherein a receiving groove is defined between the movable portion bottom plate and the movable portion side wall, wherein the photosensitive assembly is placed in the receiving groove.

Wherein a glue is disposed between an inner surface of the movable portion side wall and an outer surface of the photosensitive assembly, so as of fix the second movable portion with the photosensitive assembly.

Wherein the cover comprises a cover side wall and a supporting platform inwardly extending from a top of the cover side wall, wherein the ball and an edge region of the second base portion is clamped between the base and the supporting platform.

Wherein a second gap is formed between a lower surface of the supporting platform and the second movable portion, and the second gap is less than 10 µm.

Wherein the base comprises a substrate, wherein the second driving part comprises a driving element which is a coil-magnet assembly comprising a magnet which is arranged on an edge region of the substrate, and a coil arranged on an edge area of the movable portion bottom plate; or the coil and the magnet are respectively arranged on side walls of the second movable portion and the second base portion.

Wherein the coil-magnet assembly comprises a first coil magnet pair, a second coil magnet pair and a third coil magnet pair, wherein the first coil magnet pair and the second coil magnet pair are used to provide a driving force in the x-axis direction, the third coil magnet pair is used to provide a driving force in the y-axis direction, wherein in a top view angle, the first coil magnet pair and the second coil magnet pair are respectively arranged along a first side and a second side of the second driving part, wherein the first side and the second side do not intersect, the third coil magnet pair is arranged along a third side of the second driving part, and the third side intersects with both the first side and the second side.

Wherein the base comprises a substrate and a base side wall, wherein a first gap is formed between the movable portion side wall and the base, wherein the first gap is greater than 200 µm.

Wherein a third gap is formed between a lower surface of the movable portion bottom plate and the substrate, and the third gap is less than 10 µm.

Wherein the photosensitive assembly comprises a circuit board, and the camera module further comprises a first connecting band and a second connecting band, and the first connecting band is provided on a top area of the first driving part and electrically connected to the first driving part, wherein the second connecting band is connected and conducted with the circuit board of the photosensitive assembly, wherein the second connecting band is provided with a plurality of bends to form a curved stacked shape.

Compared with the prior art, the present application has at least one of the following technical advantages.

1. The present application can improve the optical image stabilization stroke of the camera module, so as to compensate for the larger shake of the camera module.
2. The present application can improve the optical image stabilization response speed of the camera module.
3. The driving structure for the optical actuator of the present application has the advantage of a compact structure, and is especially suitable for miniaturized camera modules.
4. In some embodiments of the present application, it can be set according to factors such as the weight of the lens, the driving force of the first driving part, the weight of the photosensitive chip (or photosensitive assembly), the driving force of the second driving part, so that the lens and the photosensitive chip move to each optical image stabilization target position with basically the same time period, so as to obtain better optical image stabilization performance.
5. In some embodiments of the present application, the interference of the connection band to the optical image stabilization movement of the photosensitive assembly can be reduced by the suspended circuit board, so as to effectively guarantee the optical image stabilization stroke and the response speed.
6. In some embodiments of the present application, the second driving part does not need to be provided with a light hole, so that the thickness of the base portion or/and the movable portion of the second driving part can be reduced, thereby helping to reduce the height of the camera module.
7. In some embodiments of the present application, both the movable portion of the second driving part and the base of the base portion are arranged under the circuit board of the photosensitive assembly, so as to avoid the problem of picture stains caused by leakage of adhesive material (referring to the problem of smudges on the shooting screen caused by the infiltration of pollutants in the imaging optical path).
8. In some embodiments of the present application, the interference of the connection band to the optical image stabilization movement of the photosensitive assembly can be reduced by the suspended circuit board, so as to effectively guarantee the optical image stabilization stroke and the response speed.
9. In the present application, when using the movement of the photosensitive chip to perform optical image stabilization, the photosensitive chip does not need to be tilted, thereby avoiding the problem of image blur caused by the optical image stabilization movement.

10. In some embodiments of the present application, in the xoy plane, the lens and the photosensitive chip are allowed to move in opposite directions at the same time, thereby not only avoid the image blur problem caused by the optical image stabilization movement, but also improve the optical image stabilization stroke and optical image stabilization response speed of the camera module.

11. In some embodiments of the present application, in the xoy plane, the lens and the photosensitive chip are allowed to move in opposite directions at the same time, thereby not only avoid the image blur problem caused by the optical image stabilization movement, but also improve the optical image stabilization stroke and optical image stabilization response speed of the camera module.

12. In some embodiments of the present application, the lower end surface of the second movable part may be lower than the lower end surface of the second base portion to ensure that the photosensitive assembly does not touch the second base after being attached to the second movable portion to prevent the photosensitive assembly from bumping into or rubbing against the cover when performing optical image stabilization movement.

13. In some embodiments of the present application, the risk of the glue used for bonding the photosensitive assembly and the second movable portion to flow onto the light filter can be reduced by designing the second member of the second movable portion with a larger area.

14. In some embodiments of the present application, the glue is arranged away from the four corners, so as to prevent the glue from leaking into the gaps of the ball containing structures located at the four corners, thereby avoiding negative impact on the optical image stabilization movement.

15. In some embodiments of the present application, the driving structure controls the second movable portion to maintain the position of the second movable portion through the cooperation of the elastic element and the driving force of the driving element, so as to avoid the pair of conjugated driving forces for maintaining the second movable portion at its initial position, so as to eliminate the need for an additional driving element for providing the conjugated driving force, thereby reducing the volume occupied by the driving element.

16. The assembly method of some embodiments of the present application can realize position adjustment based on active alignment, thereby improving the image quality of the camera module.

17. In some embodiments of the present application, the assembly of a camera module with dual OIS optical image stabilization function can be realized. The dual OIS optical image stabilization capability of the camera module of the present application can avoid the problem of image blur and can improve the optical image stabilization stroke or optical image stabilization response speed.

BRIEF DESCRIPTION OF THE DRAWINGS

FIG. 4 are respectively schematic views illustrating the relationship between the displacement distances of the lens and the photosensitive chip and the title angle of the camera module under four different conditions;

FIG. 5 is a sectional view illustrating a camera module according to an embodiment of the present invention;

FIG. 6 is a sectional view illustrating a camera module according to another embodiment of the present invention;

FIG. 7 is a sectional view illustrating a camera module according to another embodiment of the present invention;

FIG. 8 is a sectional view illustrating a camera module according to another embodiment of the present invention;

FIG. 9a is a perspective view illustrating a second driving part according to an embodiment of the present invention;

FIG. 9b is an exploded view illustrating the second driving part according to the embodiment of the present invention;

FIG. 20 is a perspective view illustrating a photosensitive assembly and its suspended circuit board used in an embodiment of the present invention;

FIG. 21a is a schematic view illustrating the front side of the unfolded suspended circuit board according to the embodiment of the present invention;

FIG. 21b is a schematic view illustrating the back side of the unfolded suspended circuit board according to the embodiment of the present invention;

FIG. 22 is a sectional view illustrating a camera module with an optical image stabilization function according to an embodiment of the present invention;

FIG. 25 is a perspective view illustrating a second driving part of the camera module according to the embodiment of the present invention;

FIG. 26 is an exploded view illustrating the second driving part according to the embodiment of the present invention;

DETAILED DESCRIPTION OF THE PREFERRED EMBODIMENT

Figure 1:
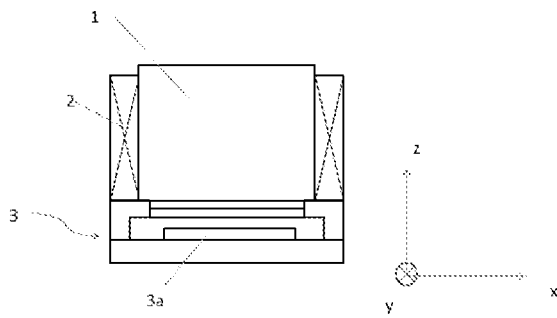
FIG. 1 is a schematic view illustrating a conventional camera module with a motor in prior art.

For better understanding of the present application, various aspects of the application will be described in more detail with reference to the accompanying drawings. It should be understood that these detailed descriptions are descriptions of exemplary embodiments of the application only, and are not intended to limit the scope of the application in any way. Throughout the specification, the same reference numerals refer to the same elements. The expression "and/or" comprises any and all combinations of one or more of the associated listed items.

It should be noted that in this specification, expressions of first, second, etc. are only used to distinguish one feature from another, and do not represent any limitation on the features. Accordingly, a first body discussed hereinafter may also be referred to as a second body without departing from the teachings of the present application.

In the drawings, the thickness, size and shape of objects have been slightly exaggerated for convenience of illustration. The drawings are examples only and are not strictly drawn to scale.

It should also be understood that the terms "comprise", "comprise of", "have", "include" and/or "including", when used in this specification, means that there are stated features, integers, steps, operations, elements and/or components, but does not exclude the presence or addition of one or more other features, integers, steps, operations, elements, components and/or combinations thereof. Also, when things like the expression of "at least one of", when appearing after a list of listed features, modifies the entire listed feature and does not modify the individual elements of the list. In addition, when describing the embodiments of the present application, the use of "may" means "one or more embodiments of the present application". Also, the word "exemplary" is intended to mean an example or illustration.

As used herein, the terms "substantially", "about", and similar terms are used as terms of approximation, not as terms of degree, and are intended to illustrate what would be recognized by one of ordinary skill in the art, measure Inherent bias in a value or calculated value.

Unless otherwise defined, all terms (including technical terms and scientific terms) used herein have the same meaning as commonly understood by one of ordinary skill in the art to which this application belongs. It should also be understood that terms (such as those defined in commonly used dictionaries) should be interpreted to have a meaning consistent with their meaning in the context of the relevant art, and will not be interpreted in an idealized or overly formal sense unless it is expressly so defined herein.

It should be noted that, in the case of no conflict, the embodiments in the present application and the features in the embodiments can be combined with each other in the case of no conflict.

The present invention will be further described below in conjunction with the accompanying drawings and specific embodiments.

Figure 2:
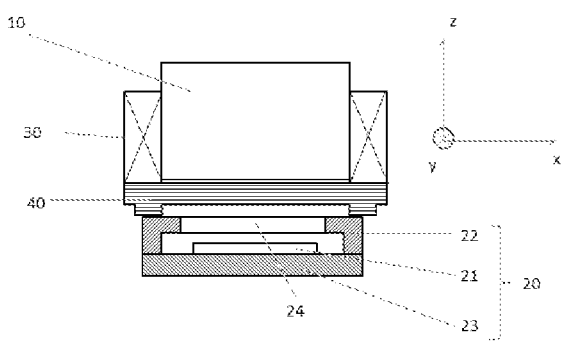
FIG. 2 is a sectional view illustrating a camera module with an optical image stabilization function according to an embodiment of the present invention.

FIG. 2 is a sectional view of a camera module with an optical image stabilization function according to an embodiment of the present invention. Referring to FIG. 2, in this embodiment, the camera module comprises a lens 10, a photosensitive assembly 20, a first driving part 30 and a second driving part 40. The photosensitive assembly 20 comprises a photosensitive chip 21. The first driving part 30 is configured to drive the lens 10 to move in the two directions of x and y, and the second driving part 40 is configured to drive the photosensitive chip 21 to move in the two directions of x and y. In this embodiment, the x and y directions are perpendicular to each other and parallel to a photosensitive surface of the photosensitive assembly 20. The z direction is parallel to the normal direction of the photosensitive surface. For ease of understanding. FIG. 2 also shows a three-dimensional Cartesian coordinate system constructed based on the x, y, and z directions. In this embodiment, the optical image stabilization function of the camera module is achieved by simultaneously driving the lens 10 and the photosensitive chip 21 to move in opposite directions by a control module. Specifically, the lens 10 and the photosensitive chip 21 are configured to be driven simultaneously and move in opposite directions. For example, when the lens 10 is driven to move toward the positive direction of the x-axis, the photosensitive chip 21 is driven to move toward the negative direction of the x-axis; when the lens 10 is driven to move toward the positive direction of the y-axis, the photosensitive chip 21 is driven to move toward the negative direction of the y-axis; when the lens 10 is driven to move in the directions of x-axis and y-axis, the photosensitive chip 21 is simultaneously driven to move in directions along x-axis and y-axis which are opposite to the moving directions of the lens 10. In other words, when simultaneous movement along the x-axis and the y-axis is required, the direction of the displacement vector of the lens 10 and the displacement vector of the photosensitive chip 21 in the xoy plane are opposite. The camera module usually comprises a position sensor which is used to detect shaking of the camera module or a terminal device (that is, an electronic device equipped with the camera module, such as a mobile phone). When shaking is detected, the position sensor sends a signal to the camera module to drive the lens 10 and the photosensitive chip 21 to make corresponding movements to compensate for the shaking, so as to achieve the purpose of optical image stabilization. In this embodiment, the lens 10 and the photosensitive chip 21 are configured to move simultaneously, and the lens 10 and the photosensitive chip 21 move in opposite directions, which can achieve faster response and better optical image stabilization performance. In addition, usually the optical image stabilization angle range of the camera module is limited by the suspension system and the driving system, and it is impossible to achieve a relatively large compensation angle range. In this embodiment, the lens 10 and the photosensitive chip 21 are driven to move in opposite directions, so as to achieve a large-angle shaking compensation. In addition, in this embodiment, by driving the lens 10 and the photosensitive chip 21 to move in opposite directions at the same time, compared with the solution of only driving the lens 10 to move, there is a larger relative movement stroke between the lens 10 and the photosensitive chip 21 (for the convenience of description, this relative movement stroke can be referred to as the optical image stabilization stroke), which can have a better compensation effect. In particular, due to the increase of the optical image stabilization stroke, this embodiment also has a better compensation effect on the tilt shaking of the camera module. Further, the movement direction of the optical image stabilization movement in this embodiment can be limited in the xoy plane, without tilting the optical axis of the lens 10 or the photosensitive chip 21, thereby avoiding the blurring problem caused by the optical image stabilization movement.

Further, in another embodiment of the present application, the photosensitive chip 21 can also be driven to rotate in the xoy plane by the second driving part 40, so as to achieve compensation for shaking in the rotation direction of the camera module.

Further, still referring to FIG. 2, in an embodiment of the present application, the camera module comprises a first driving part 30, a lens 10, a second driving part 40 and a photosensitive assembly 20. The lens 10 is mounted on the first driving part 30 which may have a cylindrical first motor carrier that can be used as a movable portion of the first driving part, and the lens is installed on an inner surface of the first motor carrier. The first driving part also has a stationary portion, or called a base portion. In this embodiment, the base portion may be implemented as a motor housing which may comprise a base and a cover. The base has a light hole. The movable portion is movably connected with the base portion. The driving element may be a coil-magnet assembly which may be mounted between the movable portion and the base portion. For example, it can be installed between the first motor carrier and the motor housing. In fact, the first driving part in this embodiment can directly adopt the common structure of the optical image stabilization motor in the prior art. Further, in this embodiment, the second driving part 40 can be supported and fixed on the bottom surface of the first driving part 30. The second driving part 40 may also comprise a base portion and a movable portion, wherein the base portion is directly connected with the first driving part, the movable portion is located below the base portion and is movably connected with the base portion. The photosensitive assembly 20 comprises a circuit board 23, a photosensitive chip 21 installed on a surface of the circuit board 23, and a lens holder 22 surrounding the photosensitive chip 21. A bottom of the lens holder 22 can be installed on the surface of the circuit board 23, and a top surface of the lens holder 22 can be fixed on the movable portion of the second driving part 40. The center of the lens holder 22 has a light hole, and a light filter 24 is mounted on the lens holder 22 (the light filter 24 can also be regarded as a component of the photosensitive assembly 20). Driven by the movable portion of the second driving part 40, the photosensitive assembly 20 can translate in the x and y directions or rotate in the xoy plane with respect to the base portion. For the convenience of description, the base portion of the first driving part 30 is sometimes called a first base portion, the base portion of the second driving part 40 is called a second base portion, and the movable portion of the first driving part 30 is called a first movable portion, the movable portion of the second driving part 40 is called a second movable portion.

Figure 3:
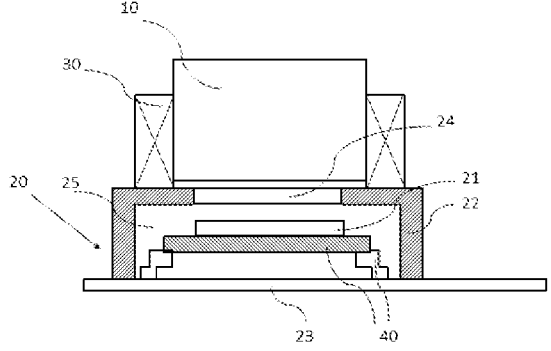
FIG. 3 is a sectional view illustrating a camera module with an optical image stabilization function according to another embodiment of the present invention.

FIG. 3 is a sectional view illustrating a camera module with an optical image stabilization function according to another embodiment of the present application. In this embodiment, the camera module comprises a first driving part 30, a lens 10, a second driving part 40 and a photosensitive assembly 20. The lens 10 is mounted on the first driving part 30. The structure and assembly manner of the first driving part 30 and the lens 10 may be consistent with the previous embodiment shown in FIG. 2, and thus will not be repeated here. The difference between this embodiment and the previous embodiment is that the second driving part

40 is located inside the photosensitive assembly 20. In this embodiment, the photosensitive assembly 20 comprises a circuit board 23, a lens holder 22, a light filter 24, and a photosensitive chip 21. A bottom of the lens holder 22 can be installed on a surface of the circuit board 23, and a top surface thereof can be fixed on a base portion of the first driving part 30. The center of the lens holder 22 has a light hole, and a light filter 24 is mounted on the lens holder 22. The lens holder 22, the light filter 24, and the circuit board 23 can form a cavity, and the photosensitive chip 21 is located in the cavity 25. In this embodiment, the second driving part 40 may also be located in the cavity 25. Specifically, a base portion of the second driving part 40 can be installed on the surface of the circuit board 23, and a movable portion of the second driving part 40 can be movably connected with the base portion. The photosensitive chip 21 is installed on a surface of the movable portion. In this way, driven by the movable portion of the second driving part 40, the photosensitive chip 21 can translate with respect to the base portion in the x and y directions or rotate in the xoy plane.

The above disclosure describes different structural implementations of the second driving part of the camera module of the present application in conjunction with the two embodiments. The following description further introduces the method of compensating the tilt shaking of the camera module based on the design concept of the present application.

FIG. 4 shows respectively schematic views illustrating the relationship between the displacement distances of the lens and the photosensitive chip, and the title angle of the camera module under four different conditions. Position A in the figures represents the combination of the movement distance of the lens and photosensitive chip used to compensate the shaking angle a of the camera module. As shown in FIG. 4, the movement distance of the lens in the figure is b, and the movement distance of the photosensitive chip (hereinafter sometimes called as chip for short) is c, and the movement distance of the lens or the chip can be equivalent to the angle at which the image plane deviates from the optical axis during optical imaging. Specifically, when the translation distance of the lens in the xoy plane is b, there is an arithmetic relationship between the image plane offset angle al and the image distance, and the image distance is different at different shooting distances. For the convenience of calculation and expression, here the image distance is replaced by the image focal length. Specifically, the relationship between the image plane offset angle al and the lens image focal length f is: $\tan(\alpha 1)=b/f$, when the photosensitive chip is translated by the movement distance c in the xoy plane, it will cause that the relationship between the image plane offset angle $\alpha 2$ and the focal length f of the image side of the lens is: $\tan(\alpha 2)=c/f$. In this embodiment, the moving directions of the lens and the photosensitive chip are opposite, so the calculation method of the comprehensive compensation angle a of the camera module is: $a=\alpha 1+\alpha 2=\arctan(b/f)+\arctan(c/f)$. In one embodiment, the movement distances of the lens and the photosensitive chip can be set to be the same, i.e. b=c. In another embodiment, the movement distances of the lens and the photosensitive chip can be set to be unequal, for example, the movement distance of the lens can be greater than the movement distance of the photosensitive chip, i.e. b>c. In this embodiment, the second driving part may choose a driver with a small size (such as a mems driver, etc., and the movable stroke of this type of driver is usually relatively small), so as to help to achieve the overall miniaturization of the camera module.

Further, in an embodiment of the present application, the ratio of the movement distance of the lens to the movement distance of the photosensitive chip can optionally be set to maintain a fixed ratio, such as b/c=6:4, or b/c=7:3, Or b/c=5:5, no matter how much the shaking compensation value (such as the comprehensive compensation angle a) of the camera module is, the movement distances of the lens and the photosensitive chip will keep the preset ratio, which is beneficial to the camera module when it can be evenly compensated within a compensable range, and it is also beneficial to reduce the design difficulty of the driving logic module of the optical image stabilization system of the camera module.

Further, in the configuration where the movement distance of the lens and the movement distance of the photosensitive chip are based on a fixed ratio for optical image stabilization movement, since the movable range of the photosensitive chip is small, sometimes the shaking of the camera module may exceed the maximum movement distance of the photosensitive chip. Therefore, in an embodiment of the present application, an optical image stabilization threshold can be set. For example, for the shaking angle a that needs to be compensated, a threshold K can be set, when the actually calculated shaking angle a is less than or equal to the anti-shake threshold K, the movement distance b of the lens is kept at a fixed ratio to the movement distance c of the photosensitive chip, and the fixed ratio can be preset, for example, b/c=6:4, or b/c=7:3, or b/c=5:5. And when the actually calculated shaking angle a is greater than the anti-shake threshold K, the movement distance c of the photosensitive chip takes the maximum value of its moving stroke, that is, the maximum stroke $c_{max}$ of the photosensitive chip, and the movement distance of the lens $b=\tan(a/f)-c_{ma}$. In other words, when the shaking angle that camera module needs to compensate is above the anti-shake threshold K, based on a preset fixed ratio, the lens moves to a position corresponding to the maximum movement distance of the photosensitive chip (i.e., the maximum stroke $c_{max}$ of the photosensitive chip), the first driving part can drive the lens to continue move until the lens movement distance $b=\tan(a/f)-c_{max}$. At the same time, the photosensitive chip first synchronously moves towards the opposite direction to the maximum movement distance $c_{max}$ of the photosensitive chip, and then remains still.

Further, in another embodiment of the present application, in the xoy plane, the optical image stabilization angle corresponding to the maximum movement stroke $b_{max}$ of lens (the optical image stabilization angle refers to the angle at which the camera module tilts and shakes) may be smaller than optical image stabilization angle corresponding to the maximum stroke $c_{max}$ of the photosensitive chip. Under this design, the optical image stabilization system of the camera module can have a faster response speed. In high-end lenses, the lens often has a large number of lenses, for example, the number of lenses in the rear main lens of a smartphone can reach eight. In order to further improve the imaging quality, some lenses also use glass lenses, these all lead to the relatively large weight of the lens. When the driving force does not increase significantly, the speed at which the driving device drives the lens to move will decrease. However, when the photosensitive chip or photosensitive assembly is relatively light in weight, the photosensitive chip or photosensitive assembly can reach the preset position under a small driving force. Therefore, in the solution of this embodiment, the response speed of the optical image stabilization system of the camera module can be improved effectively by utilizing the advantages that the weight of the photosensitive chip or the photosensitive assembly is relatively approximate and their moving speed is relatively fast.

Further, in another embodiment of the present application, the fixed ratio between the movement distance of the lens and the movement distance of the photosensitive chip can be set based on the factors such as the weight of the lens, the driving force of the first driving part, the weight of the photosensitive chip (or photosensitive assembly), and the driving force of the second driving part. Setting an appropriate fixed ratio can make the time for the lens and the photosensitive chip to move to their respective optical image stabilization target positions to be basically the same, thereby obtaining a better optical image stabilization performance. Specifically, the weight of the lens and the driving force of the first driving part can basically determine the moving speed of the lens, while the weight of the photosensitive chip (or photosensitive assembly) and the driving force of the second driving part can basically determine the moving speed of the photosensitive chip. When the moving speed of the lens is lower than the moving speed of the photosensitive chip (for example, the case where the weight of the lens is large), when setting the fixed ratio, the movement distance of the photosensitive chip can occupy a larger proportion, so that the faster moving speed of the photosensitive chip can be used, so as to make the photosensitive chip move a longer distance, so that the time for the lens and photosensitive chip to move to their respective optical image stabilization target positions is substantially the same.

Further, in another embodiment of the present application, the first driving part may adopt a driving element with a relatively large driving force and a suspension system with a large stroke. For example, the first driving part may be driven by an SMA (shape memory alloy) element. Compared with the conventional coil-magnet assembly, the SMA element can provide a larger driving force with a smaller occupying space, so that the first driving part can be designed more compact, which is beneficial to the miniaturization of the camera module.

Further, FIG. 5 is a sectional view illustrating a camera module according to an embodiment of the present application. Referring to FIG. 5, in this embodiment, a base portion 41 of the second driving part 40 is fixed together with the base portion (not specifically shown in FIG. 5) of the first driving part 30. The lens 10 may be mounted on a movable portion of the first driving part 30 (for example, a first motor carrier, not specifically shown in FIG. 5). The photosensitive assembly 20 comprises a circuit board 23, a photosensitive chip 21, a lens holder 22, a light filter 24 and the like. The photosensitive assembly 20 can be mounted on a movable portion 42 of the second driving part 40. Specifically, the bottom surface of the movable portion 42 can bear against the top surface of the lens holder 22 of the photosensitive assembly 20. Wherein, in the second driving part 40, the base portion 41 and the movable portion 42 may be elastically connected by a suspension system. In this embodiment, the suspension system allows the movable portion 42 to translate in the xoy plane with respect to the base portion 41. Optionally, the suspension system can be a ball system which has the advantage that in the z direction, the movable portion 42 and the base portion 41 are in contact with each other through balls, and the movable portion 42 only moves in the xoy plane, while in the direction of the optical axis, the movement can be stopped by the ball between the movable portion 42 and the base portion 41, so as to avoid affecting the focus of the camera module.

Optionally, in another embodiment, the suspension system may comprise an elastic element (such as a spring), through which the fixing portion and the movable portion are connected, which allows the movable portion to translate in the xoy plane with respect to the base portion but prevents unwanted movement of the movable portion with respect to the base portion toward outside of the xoy plane. Compared with the ball system, the advantage of setting the elastic element is that the elastic element can provide an initial force between the base portion and the movable portion, and the initial force can control the movement distance of the movable portion or maintain its position by cooperating with the driving force of the driving element, there is no need to set additional driving elements to provide conjugate driving force to control the position of the movable portion. If a ball system is used, the movable portion is free to move in the xoy direction with respect to the base portion when the driving element does not provide a driving force, so that it is often necessary to provide at least one pair of mutually opposite driving forces to control the movement of the movable portion for keeping its initial position.

Further, still referring to FIG. 5, in an embodiment of the present application, the optical image stabilization can be realized by driving the entire photosensitive assembly 20 to move. Simultaneously, the circuit board 23, the photosensitive chip 21, the lens holder 22, the light filter 24 are packaged as a whole, and the circuit board 23, the lens holder 22, the light filter 24 form a closed space, and the photosensitive chip 21 is accommodated in this closed space, which improves the sealing effect of the photosensitive assembly 20 and ensures that the imaging of the photosensitive chip 21 is not affected by dust during the production or use of the camera module.

In this embodiment, still referring to FIG. 5, in one embodiment of the present application, the back of the circuit board can directly bear against the terminal device (that is, the electronic device equipped with the camera module, such as a mobile phone), specifically That is to say, a back side of the circuit board 23 can be supported by the main board of the terminal device or other supporting element 90. Although in this embodiment, the movable portion 42 is connected to the photosensitive assembly 20 and the base portion 41 is connected to the first driving part 30, it can be understood that the movement of the movable portion 42 and the base portion 41 are relative. In the optical image stabilization movement, the moving directions are opposite means that the moving direction of the movable portion of the first driving part with respect to its base portion is opposite to the moving direction of the movable portion of the second driving part with respect to its base portion.

Further, FIG. 6 is a sectional view illustrating a camera module according to another embodiment of the present application. Referring to FIG. 6, in the present embodiment, a rear shell 49 is added below the second driving part 40, and the rear shell 49 is connected with the base portion 41 of the second driving part 40 to form an accommodation chamber for receiving both the movable portion 42 of the second driving part 40 and the photosensitive assembly 20. As shown in FIG. 6, there may be a gap 49a between the photosensitive assembly 20 and a bottom of the rear shell 49. That is, the photosensitive assembly 20 is suspended, and the photosensitive assembly 20 is only connected to the movable portion 42 of the second driving part 40. In this embodiment, the rear shell 49 directly biases against the terminal device. Since the rear shell 49 connect the terminal device with the base portions of the second driving part 40 and the first driving part 30, during the optical image stabilization process, with the terminal device as a reference, the first driving part 30 and the second driving part 40 simultaneously actuate their movable portions to respectively drive the lens and the photosensitive assembly 20 to move in opposite directions. Further, in this embodiment, the movable portion 42 of the second driving part 40 is directly bonded to the upper end surface of the photosensitive assembly 20, so that the light filter 24 can be separated from the external space, thereby preventing the debris generated by friction or collision during the movement of the base portion 41 from falling on the surface of the light filter 24 when the movable portion 42 is moving with respect to the base portion 41.

FIG. 7 is a sectional view illustrating a camera module according to another embodiment of the present application. Referring to FIG. 7, in this embodiment, the first driving part 30 is implemented to be suitable for driving the lens 10 to move in the direction of the optical axis to realize the focus function, and also to drive the lens 10 to move in the xoy plane to realize the optical image stabilization function. Optionally, the first driving part 30 comprises at least two carriers, namely a first carrier 31 and a second carrier 32, the lens 10 rests on the first carrier 31, a suspension system is provided between the first carrier 31 and the second carrier 32, and another suspension system is provided between the second carrier 32 and the casing 33 of the first driving part 30. In this embodiment, the suspension system (i.e. the first suspension system) between the first carrier 31 and the second carrier 32 is set to be a ball system, and the another suspension system (i.e. the second suspension system) between the second carrier 32 and the housing 33 is a suspension system based on elastic elements such as elastic sheets. In this embodiment, the second suspension system is arranged outside the first suspension system. The first suspension system allows the lens 10 and the first carrier 31 to translate in the xoy plane to realize the optical image stabilization function. The second suspension system allows the lens 10, the first carrier 31 and the second carrier 32 integrally move in the direction of the optical axis to realize the focusing function. Optionally, in another embodiment, the second suspension system can also be arranged inside the first suspension system. In another alternative modified embodiment, the second suspension system can also be arranged below the first suspension system. In this embodiment, the suspension system refers to a system in which two components are movably connected, and the degree of freedom of relative movement (i.e., the direction of movement) of the two components is limited to a certain extent. These two movably connected components can be called as a base portion and a movable portion respectively. Typically, the suspension system is used with a driving element such as SMA element or coil-magnet assembly. Wherein, the driving force is provided by the driving element, under the action of the driving force, the movable portion moves with respect to the base portion in the moving direction defined by the suspension system.

Further, FIG. 8 is a sectional view illustrating a camera module according to another embodiment of the present application. Referring to FIG. 8, the movable portion of the second driving part 40 in this embodiment may be provided with an extending arm 42a extending downward, and the extending arm 42a is bonded to the circuit board 23 of the photosensitive assembly 20. An FPC board 42b can be provided on the extending arm 42a, and the FPC board 42b can be directly welded to the circuit board 23, so that the driving element mounted on the movable portion is electrically connected to the circuit board 23. This embodiment can prevent the glue from flowing onto the light filter to affect the imaging when the photosensitive assembly 20 is bonded to the movable portion. In addition, in this embodiment, there is a gap between the upper end surface (i.e., the top end) of the photosensitive element 20 and the second driving part 40, which can prevent the light filter from being scratched or broken.

Further, FIG. 9a is a perspective view illustrating the second driving part according to one embodiment of the present application, FIG. 9b is an exploded view illustrating the second driving part according to the embodiment of the present application. Referring to FIG. 9a and FIG. 9b, in this embodiment, the centers of the movable portion 42 and the base portion 41 of the second driving part 40 both have a light hole through which the light passing through the lens enters the photosensitive chip and forms an image. In this embodiment, there are preferably four balls 80 which are respectively arranged at the four corners of the second driving part 40 (referring to the four corners in a top view).

Figure 10A:
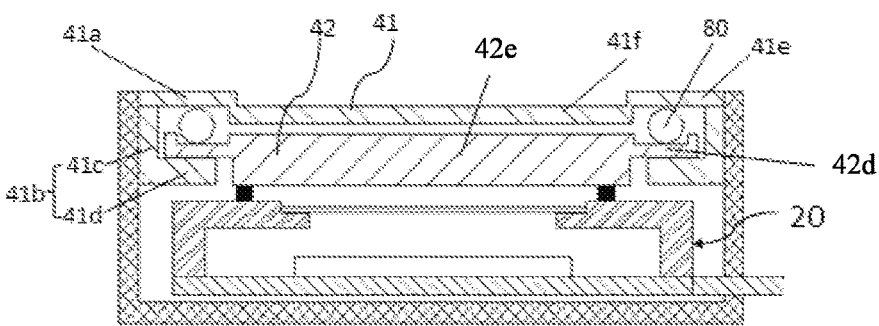
FIG. 10a is a sectional view illustrating a second driving part and a photosensitive assembly according to an embodiment of the present invention.

Further, FIG. 10a is a sectional view illustrating the second driving part and the photosensitive assembly in one embodiment of the present application. Referring to FIG. 10a, in this embodiment, the second driving part 40 comprises a movable portion 42 and a base portion 41, wherein the base portion 41 comprises a base 41a and a cover 41b. The cover 41b comprises a side wall 41c extending downward from the base 41a to surround the movable portion 42 and a supporting platform 41d extending horizontally inward from the side wall 41c. A top of the side wall 41c is connected to the base 41a, and a lower surface of an edge region 42d of the movable portion 42 can bias against an upper surface of the supporting platform 41d. The ball 80 and the edge region 42d of the movable portion 42 are clamped between the base 41a and the supporting platform 41d of the cover 41b, so as to ensure that the movable portion 42 and the base portion 41 are not in the direction of the optical axis (that is, the z-axis direction), so that there will be no relative movement. In this way, the second driving part 40 only allows the movable portion 42 to translate with respect to the base portion 41 in the xoy plane. More specifically, at least one accommodating space is provided between the base 41a and the cover 41b, the accommodating space is provided with the ball 80, and the movable portion 42 and the base 41a are respectively in close contact with the ball 80, thereby ensuring that the movable portion 42 and the base portion 41 does not produce relative movement in the direction of the optical axis. The movable portion 42 may include a main body portion 42b and an edge region 42d, and the thickness of the edge region 42d may be smaller than the thickness of the main body portion 42b. A lower surface (also referred to as a lower end surface) of the main body portion 42b may be lower than a lower surface (also referred to as a lower end surface) of the cover 41b, so as to ensure that when the photosensitive assembly 20 is attached to the movable portion 42, it will no touch the cover 41b, so as to prevent the photosensitive assembly 20 from bumping into or rubbing against the cover when it is moving for optical image stabilization.

Further, still referring to FIG. 10a, in an embodiment of the present application, an upper surface of the base portion 41 may have a stepped structure, and the stepped structure may comprise a first stepped surface 41e located on the outside and a second stepped surface 41f located on the inside. The height of the second stepped surface 41f is lower than that of the first stepped surface 41e, so as to provide a large axial (i.e., z-axis direction) movement space for the focusing of the camera module. In this embodiment, the first driving part can be mounted on the first stepped surface 41*e* of the base portion 41 of the second driving part 40. An upper surface of the edge region 42*d* of the movable portion 42 can form a groove, which can accommodate the ball 80 and limit the movement of the ball 80 in the groove, and can also keep the debris generated by the friction between the ball 80 and the movable portion 42 or the base portion 41 remain in the groove. Moreover, since the ball 80 can be placed in the groove, the movable portion 42, the base 41*a* and the cover 41*b* of the base portion 41 can be assembled more conveniently. In another embodiment, the protruded platform on the outside of the groove can be omitted, and this design can reduce the lateral dimension of the second driving part, which is beneficial to the miniaturization of the camera module. Since the outer protruded platform around the groove is canceled, the groove actually degenerates into a concave step, the outer step surface of the concave step is lower than the inner step surface, and the concave step is in cooperation with the side wall of the cover and the base to form an accommodating chamber for accommodating the ball.

Further, in an embodiment of the present application, a plurality of grooves may be provided on the edge region of the movable portion, and the number of grooves may match the number of the balls. Each of the balls is accommodated in a corresponding groove. A bottom surface of the groove can be a plane, which can ensure that the movable portion will not tilt during translation, and at the same time, only a single layer of the ball can realize the relative movement between the movable portion and the base portion on three axes in the xoy plane. Optionally, a base groove may also be provided at a position of the base corresponding to the groove of the movable portion. Under the premise that the diameter of the ball is constant, this design can reduce the thickness of the second driving part. Moreover, the bottom surface of the groove or the bottom surface of the concave step (referring to the outer step surface of the concave step) is a plane, which can allow the movable portion to rotate in the xoy plane with respect to the base portion, that is, to rotate around the z axis. The direction of rotation around the z-axis may be referred to as the Rz direction, and may also be referred to as the Rz-axis rotation. In this embodiment, the photosensitive chip can move in three directions of x, y, and Rz to realize the optical image stabilization, so that it has a better optical image stabilization ability. Since the three moving directions of x, y, and Rz are all in the xoy plane, the relative movement on the three axes in the xoy plane mentioned above refers to the movement in the three directions of x, y, and Rz.

Figure 10B:
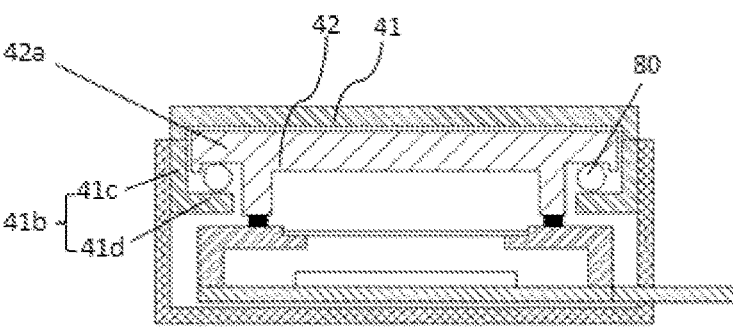
FIG. 10b is a sectional view illustrating a second driving part in which a ball is provided at a lower side of a movable portion according to an alternative mode of the present invention.

FIG. 10*b* is a sectional view illustrating the second driving part in which the ball is arranged on a lower side of the movable portion in an alternative modified embodiment of the present application. Referring to FIG. 10*b*, in this embodiment, the ball 80 is located between the supporting platform 41*d* of the cover 41*b* and the movable portion 42. At the position corresponding to the ball 80, the edge region 42*d* of the movable portion 42 and/or the supporting platform 41*d* can be provided with a groove, and a bottom surface of the groove can be set as a plane, so that the movable portion 42 can only be move in the xoy plane with respect to the base portion 41, and there is no tilt when moving in the xoy plane.

Figure 10C:
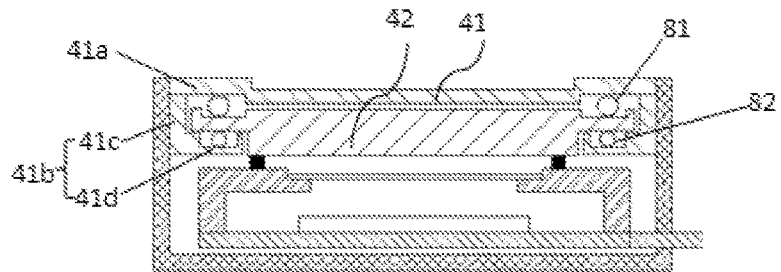
FIG. 10c is a sectional view illustrating a second driving part which comprises two layers of balls according to an another alternative mode of the present invention.

FIG. 10*c* is a sectional view illustrating the second driving part with two layers of balls in an alternative modified embodiment of the present application. In this embodiment, two layers of balls 81 and 82 are provided. Specifically, a layer of balls 81 is disposed between the base 41*a* and the movable portion 42, and a layer of ball 82 is disposed between the movable portion 42 and the supporting platform 41*d* of the cover 41*b*. Compared with the embodiment shown in FIG. 10*a*, in this embodiment, the layer of ball 82 is added between the movable portion 42 and the supporting platform 41*d*, so that the movable portion 42 will not directly touch the supporting platform 41*d* during the optical image stabilization movement, so as to reduce the debris generation. And by setting two layers of balls 81 and 82, the resistance of the movable portion 42 during movement can be reduced.

Figure 11A:
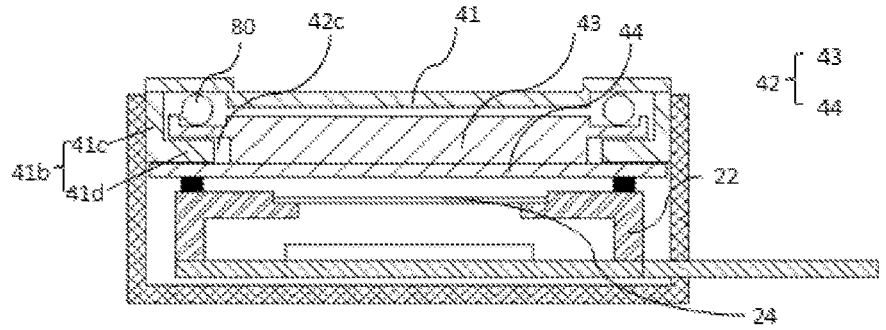
FIG. 11a is a sectional view illustrating a second driving part according to an embodiment of the present invention.
Figure 11B:
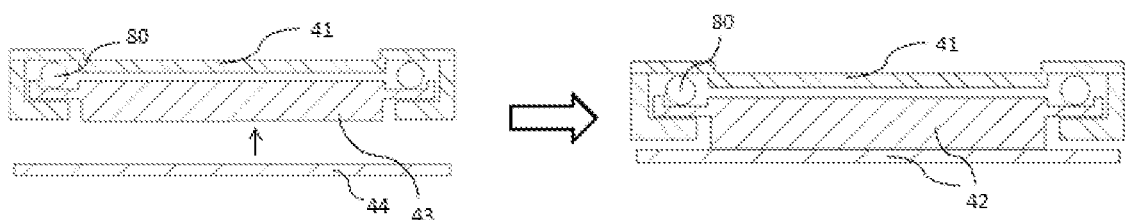
FIG. 11b is are schematic views illustrating the assembling process of the second driving part according to the embodiment of the present invention.

Further, FIG. 11*a* is a sectional view illustrating the second driving part according to an embodiment of the present application. Referring to FIG. 11*a*, in this embodiment, an outer surface of the movable portion 42 is provided with an inwardly concave clamping groove 42*c*, and the supporting platform 41*d* of the cover 41*b* of the base portion 41 fits into the clamping groove 42*c*. In this solution, the lower end surface of the second driving part 40 can have a larger area, and when the lens holder 22 is attached to the movable portion 42, the glue can be arranged at the outer area of the lens holder 22, so that the glue can be kept as far away from the light filter as possible, so as to reduce the risk of glue flowing onto the light filter 24, and also completely avoids the risk of the lens holder 22 rubbing against the base portion 41 during the optical image stabilization movement process. Further, in this embodiment, the movable portion 42 may be split type. For example, the movable portion 42 may comprise a first member 43 of the second movable portion and a second member 44 of the second movable portion. The second member of the movable portion 42 and/or the side of the first member 43 of the movable portion is recessed inwardly to form the clamping groove 42*c*. Further, FIG. 11*b* shows a schematic diagram illustrating the assembling process of the second driving part in one embodiment of the present application. Referring to FIG. 11*a* and FIG. 11*b*, in the assembling process of the second driving part 42, the first member 43 of the movable portion, the base portion 41 and the ball 80 can be assembled first, and then the second member 44 of the movable portion can be attached on the lower end surface of the first member 43 of the movable portion. With this design, there is no need to worry about the glue touching the base portion when attaching the lens holder. At the same time, the glue can also be placed near the edge of the lens holder (it is not necessary to avoid the base at the four corners) to avoid the glue from polluting the light filter.

Figure 11C:
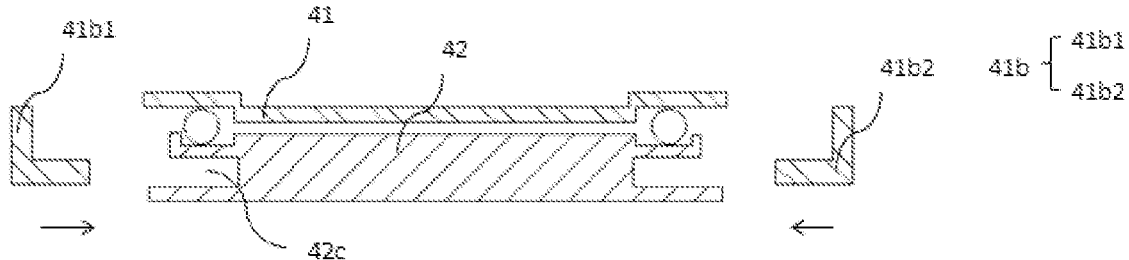
FIG. 11c is a sectional view illustrating a second driving part according to another embodiment of the present invention.

Optionally, FIG. 11*c* is a sectional view illustrating the second driving part according to another embodiment of the present application. Referring to FIG. 11*c*, in this embodiment, the movable portion 42 may be integrally formed, that is, the clamping groove 42*c* is formed directly when the movable portion 42 is formed. And the cover 41*b* may be a split type. Referring to FIG. 11*b*, the cover 41*b* may comprise two separated cover members 41*b*1 and 41*b*2 which can be inserted laterally into the clamping groove 42*c* of the movable portion 42 from the left and right sides respectively to fix the axial (i.e., z-axis direction) positions of the movable portion 42 and the base portion 41, so as to complete the packaging of the second driving part 40.

Figure 12:
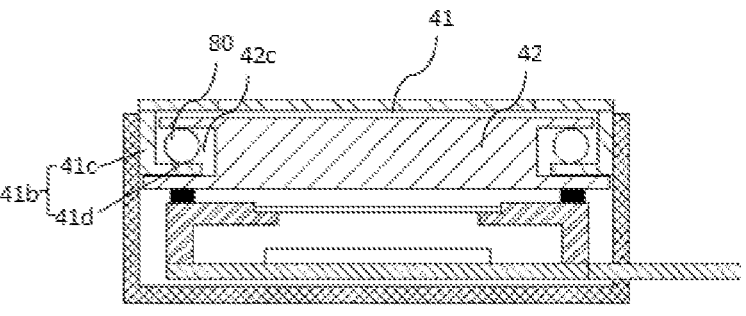
FIG. 12 is a sectional view illustrating a second driving part according to another embodiment of the present invention.

Further, FIG. 12 is a sectional view illustrating the second driving part in another embodiment of the present application. Referring to FIG. 12, in this embodiment, the outer surface of the movable portion 42 is provided with an inwardly recessed clamping groove 42*c*, and the supporting platform 41d of the base portion 41 and the ball 80 are both arranged in the clamping groove.

Further, in an embodiment of the present application, the movable portion is bonded to the upper end surface of the lens holder of the photosensitive assembly, so as to realize the connection between the movable portion and the photosensitive assembly. In an alternative embodiment, the movable portion may also be configured to have an extending arm which is extending downward, and the circuit board of the photosensitive assembly is adhered to the circuit board of the photosensitive assembly through the extending arm, so as to realize the connection between the movable portion and the photosensitive assembly. With reference to FIG. 8, in the solution where the extending arm 42a of the movable portion is bonded to the circuit board 23, optionally, the lens holder can be selected as a small lens holder 22a with a lower height, and the small lens holder 22a is only used to install the photosensitive chip 21. Higher electronic components 25 such as capacitors are arranged on the outside of the photosensitive chip 21 and the small lens holder 22a. This solution can reduce the height of the lens holder, thereby reducing the back focus of the camera module, thereby reducing the overall height of the camera module. In this embodiment, since at least part of the electronic components are arranged outside the lens holder, preferably, the outer surface of the movable portion of the second driving part 40 has the clamping groove, so that the extension arm is arranged at the edge of the second driving part, so that the extension arm is as far away from the electronic components as possible, so as to avoid the influence of the glue on the electronic components.

Figures 13A, 13B:
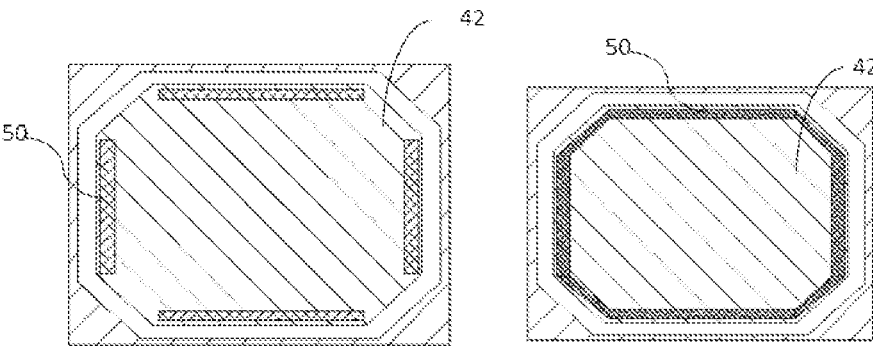
FIG. 13a is a bottom view illustrating a movable portion of a second driving part according to an embodiment of the present invention.
FIG. 13b is a bottom view illustrating a movable portion of a second driving part according to another embodiment of the present invention.

FIG. 13a is a bottom view illustrating the movable portion of the second driving part in one embodiment of the present application. In this embodiment, the glue 50 is disposed between the lower end surface of the movable portion 42 and the upper end surface of the lens holder of the photosensitive assembly. The arrangement of the glue 50 can avoid the four-corner areas, so as to prevent the glue 50 from leaking into the gaps of the ball containing structures located at the four corners, and negatively affecting the optical image stabilization movement. At the same time, it can also prevent the edge of the movable portion 42 from being too close to the light filter, reducing the risk of glue contaminating the light filter. FIG. 13b is a sectional view illustrating the movable portion of the second driving part in another embodiment of the present application. In this embodiment, the glue 50 can be arranged in a closed circle along the edge area of the lower end surface of the movable portion 42. This design can increase the sealing performance of the photosensitive assembly and prevent dust from falling onto the light filter.

It should be noted that the above embodiments can be combined with each other, for example, the clamping groove design shown in FIG. 11a, FIG. 11b and FIG. 12 can be combined with the double-layer ball design. Accordingly, the groove/concave step can be arranged on the supporting platform or on the movable portion.

Figure 14:
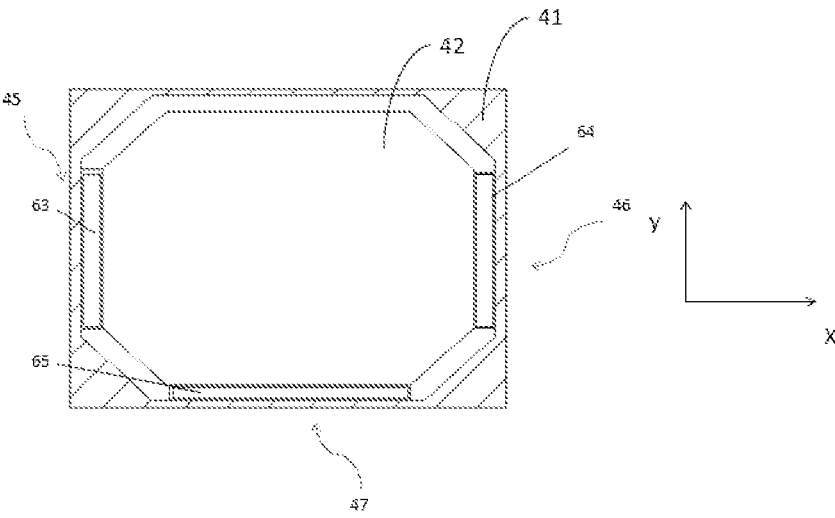
FIG. 14 is a bottom view illustrating an assembling position of a driving element of a second driving part according to an embodiment of the present invention.
Figure 15A:
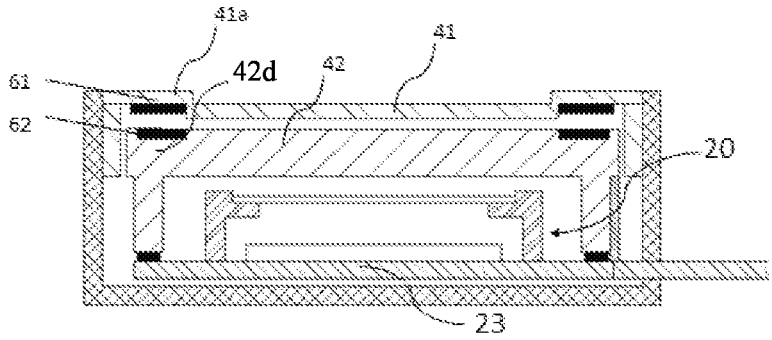
FIG. 15a is a sectional view illustrating a second driving part comprising a driving element according to an embodiment of the present invention.

Further, FIG. 14 is a bottom view illustrating the assembling position of the driving element of the second driving part in an embodiment of the present application. FIG. 15a shows the second driving part comprising the driving element in one embodiment of the present application. Referring to FIG. 14 and FIG. 15a, in one embodiment of the present application, the driving element of the second driving part 40 is a coil-magnet assembly, wherein the magnet 61 can be arranged on the edge region of the base portion 41, and the coil 62 can be arranged on the edge region 42d of the movable portion 42. The coil 62 can pass through the FPC board (flexible board) arranged on the movable portion 42, and the FPC board and the circuit board 23 of the photosensitive assembly 20 are soldered and conducted. Since the movable portion 42 and the photosensitive assembly 20 move synchronously during the optical image stabilization process, welding the coil 62 to the circuit board 23 through the FPC board can ensure that the wire or the welding part does not move with respect to each other during the movement, which reduces the risk of connection failure or poor contact at the welding position. In this embodiment, the magnet may be disposed on the base 41a of the base portion 41.

Figure 15B:
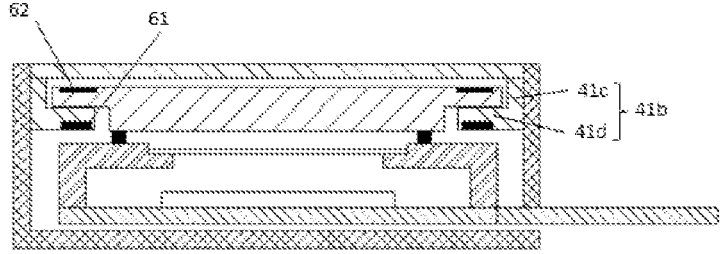
FIG. 15b is a sectional view illustrating a second driving part comprising a driving element according to another embodiment of the present invention.

Further, FIG. 15b is a sectional view illustrating the second driving part comprising the driving element in another embodiment of the present application. Referring to FIG. 15b, in this embodiment, the magnet 61 is disposed on the supporting platform 41d of the cover 41b of the base portion 41.

Figure 15C:
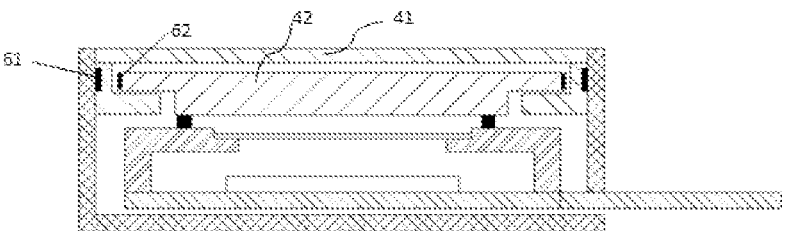
FIG. 15c is a sectional view illustrating a second driving part comprising a driving element according to another embodiment of the present invention.

Further, FIG. 15c is a sectional view illustrating a second driving part comprising a driving element in another embodiment of the present application. In this embodiment, the coil 62 and the magnet 61 can be disposed on the side walls of the movable portion 42 and the base portion 41. This design is beneficial to reduce the thickness of the second driving part 40, thereby reducing the height of the camera module.

Still referring to FIG. 14, in one embodiment of the present application, preferably, three coil magnet pairs (one coil magnet pair is a coil-magnet assembly) which are respectively referred to as the first coil magnet pair 63 and the second coil magnet pair 64 and the third coil magnet pair 65, wherein the first coil magnet pair 63 and the second coil magnet pair 64 are used to drive the translation of the movable portion 42 in the x-axis direction, that is, to provide a driving force in the x-axis direction. The third coil magnet pair 65 is used to drive the translation of the movable portion 42 in the y-axis direction, that is, to provide a driving force in the y-axis direction. In a top view (or bottom view), the first coil magnet pair 63 and the second coil magnet pair 64 can be respectively arranged along two opposite sides of the second driving part, and these two opposite sides can be referred to as a first side 45 and a second side 46, the first side 45 and the second side 46 do not intersect. And the second coil magnet pair 64 can be arranged along a third side 47 of the second driving part, and the third side 47 intersects with both the first side 45 and the second side 46. In this embodiment, the three coil magnet pairs can not only realize x-axis translation and y-axis translation, but also can realize rotation in the xoy plane. For example, when the first coil magnet pair 63 and the second coil magnet pair 64 provide driving forces in opposite directions, a combined driving force for rotating the movable part in the xoy plane can be generated. It should be noted that the way to provide the driving force for the rotation in the xoy plane is not unique. For example, the first coil magnet pair 63 and the third coil magnet pair 65 can also produce the rotation of the movable portion in the xoy plane by a combined driving force. Optionally, the positions of the first coil magnet pair and the second coil magnet pair can be staggered (that is, the positions of the first coil magnet pair and the second coil magnet pair can be asymmetrical with respect to the central axis of the second driving part), so that the driving force is provided to realize the rotation of the movable portion in the xoy plane (that is, the movement in the Rz direction).

Figure 16A:
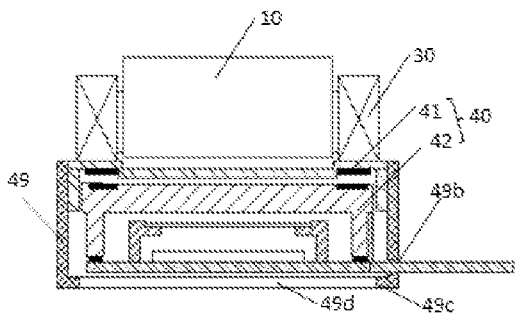
FIG. 16a is a sectional view illustrating a camera module according to an embodiment of the present invention.

Further, FIG. 16a is a sectional view illustrating a camera module according to an embodiment of the present application. Referring to FIG. 16a, in this embodiment, a side wall of the rear shell 49 may have a first through hole 49b, so that the flexible board (FPC) of the circuit board 23 can pass through, so as to realize electrical connection with the main board or other components of the terminal device. A center of a bottom plate 49c of the rear shell 49 may have a second through hole 49d to facilitate the assembly of the camera module. The process of assembling the camera module may comprise the following steps: firstly, installing the lens 10 on the first driving part 30, then attaching the second driving part 40 to the bottom of the first driving part 30, and finally making the photosensitive assembly 20 passing through the second through hole 49d of the bottom of the rear shell 49 and attaching upwardly the photosensitive assembly 20 to the movable portion 42 of the second driving part 4.

Figure 16B:
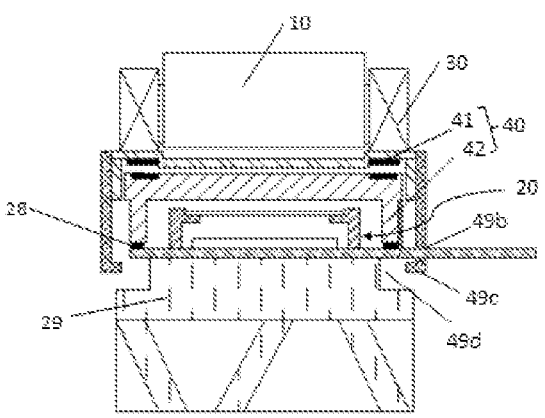
FIG. 16b are schematic views illustrating the assembling process of the camera module according to the embodiment of the present invention.

FIG. 16b is a schematic diagram illustrating the assembly method of the camera module according to an embodiment of the present application. In this embodiment, optionally, the photosensitive assembly 20 can be placed on an adjustment device 29, and the second through hole 49d at the bottom of the rear shell 49 allows the adjustment device 29 to determine its preferred position and posture of the photosensitive assembly 20 through an active alignment process, and then bond it with the movable portion 42 of the second driving part 40 by glue 28.

Figure 16C:
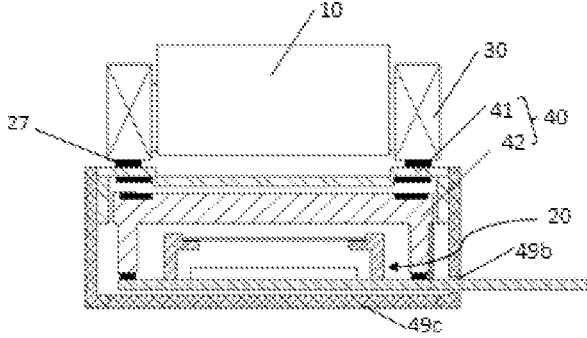
FIG. 16c is a sectional view illustrating a camera module according to another embodiment of the present invention.

FIG. 16c is a sectional view of a camera module according to another embodiment of the present application. Referring to FIG. 16c, in this embodiment, the bottom of the rear shell 49 is a complete bottom plate 49c, that is, there is no second through hole formed in the bottom plate 49c, and the second driving part 40 and the photosensitive assembly 20 can be attached together first when assembling to form a first assembly, the first driving part 30 and the lens 10 are assembled together to form a second assembly, and then the relative position of the first assembly and the second assembly is determined through an active alignment process (the active alignment comprises position and posture adjustment), and finally bond the first driving part 30 with the second driving part 40 according to the relative position determined by the active alignment process, wherein a glue 27 for bonding the first assembly and the second assembly can be arranged on between the bottom surface of the first driving part 30 and the top surface of the second driving part 40.

Figure 17:
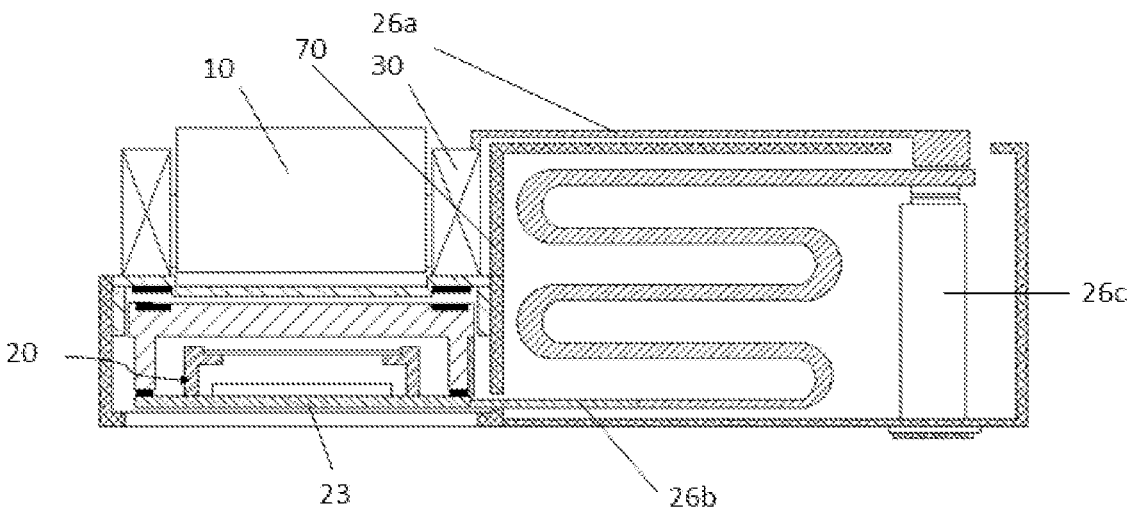
FIG. 17 is a schematic view illustrating the layout of a camera module and its connecting band according to an embodiment of the present invention.

Further, FIG. 17 is a schematic view illustrating the arrangement of the camera module and its connecting band in one embodiment of the present application. Referring to FIG. 17, in this embodiment, the camera module may comprise a first connecting band 26a and a second connecting band 26b. The first connecting band 26a is arranged on the top area of the first driving part 30 and is electrically connected to the first driving part 30, the second connecting band 26b is communicated with the circuit board 23 of the photosensitive assembly 20. The second connecting band 26b can be provided with multiple bends to form a bent and laminated shape, so as to buffer the stress caused by the movement of the photosensitive assembly 20. A connector may be provided at an end of the second connecting band 26b, and the connector may be fixed and electrically connected to an intermediate transfer column by pressing, and then is connected to the main board (or other components) of the terminal device through the intermediate transfer column 26c. Similarly, an end of the first connecting band 26a can also be connected to a connector, which can be fixed and electrically connected to the intermediate transfer column 26c by pressing, and then is conducted with the main board (or other components) of the terminal device through the intermediate transfer column 26c. In the solution of this embodiment, a conduction circuit of the first driving part 30 can be separated from the photosensitive assembly 20 and is not affected by the movement of the photosensitive assembly 20. The second connecting band 26b and the intermediate transfer column 26c can be accommodated in a second housing 70, the first connection band 26a is located outside the second housing 70, and a top of the second housing 70 can have a third through hole 70a, so that the connector of the first connecting band 26a protrudes into and is in electric connection with the second connecting band 26b or the intermediate transfer column 26c.

In the above embodiment, the first driving part and the second driving part may constitute a driving structure for the optical actuator, in the driving structure, the first driving part is suitable for installing the lens, and the second driving part is suitable for installing the photosensitive assembly, the lens and the photosensitive chip are configured to be driven simultaneously and move in opposite directions. For example, if the lens is driven to move in the positive direction of the x-axis, the photosensitive chip is driven to move in the negative direction of the x-axis; if the lens is driven to move in the positive direction of the y-axis, the photosensitive chip is driven to move in the negative direction of the y-axis; if the lens is driven to move in both directions of the x-axis and y-axis, and the photosensitive chip is driven to move in the direction opposite to the lens movement in the directions of the x-axis and y-axis. In other words, when it is necessary to move in the x-axis and y-axis at the same time, the displacement vector of the lens and the displacement vector of the photosensitive chip are opposite the xoy plane. In this embodiment, the lens and the photosensitive chip are configured to move simultaneously, and the lens and the photosensitive chip move in opposite directions, which can achieve faster response and better optical image stabilization effect. In addition, usually the optical image stabilization angle range of the camera module is limited by the suspension system and the driving system, and it is impossible to achieve a relatively large compensation angle range. In this embodiment, shaking compensation at large angles is achieved by driving the lens and the photosensitive chip to move in opposite directions. In addition, in this embodiment, by driving the lens or the photosensitive chip to move in opposite directions at the same time, compared with the solution of only driving the lens to move, there is a larger relative movement stroke between the lens and the photosensitive chip (for ease of description, this relatively moving stroke is referred to as the optical image stabilization stroke), which can have a better compensation effect. In particular, due to the increase of the optical image stabilization stroke, this embodiment also has a better compensation effect on the tilt shaking of the camera module. Further, the movement direction of the optical image stabilization movement in this embodiment can be limited in the xoy plane, without tilting the optical axis of the lens or the photosensitive chip, thereby avoiding the blurring problem caused by the optical image stabilization movement.

Further, in the camera module, the circuit board of the photosensitive assembly usually comprises a rigid circuit board body and a flexible connecting band, one end of the flexible connecting band is connected to the circuit board body, and the other end is connected and conducted through a connector with a motherboard or other component of an electronic device. In the prior art, the flexible connecting band of the photosensitive assembly is usually led out from a side of the circuit board body, and the flexible connecting band is roughly parallel to a surface of the circuit board. In this arrangement, the flexible connecting band will generate greater resistance to the movement of the circuit board body, which may increase the force required to drive the circuit board body, resulting in insufficient stroke for optical image stabilization compensation and poor response speed. Moreover, the resistance caused by the connecting band is irregular, which makes it difficult for the second driving part to compensate for the resistance, which may result in a decrease in the accuracy of the optical image stabilization compensation. Therefore, in this embodiment, a suspended circuit board is provided as the circuit board of the photosensitive assembly adapted to the second driving part, and this design method will help to overcome the above-mentioned defects caused by the connecting band.

Figure 18:
FIG. 18 is a perspective view illustrating a second driving part being assembled with a photosensitive assembly according to an embodiment of the present invention.
Figure 19:
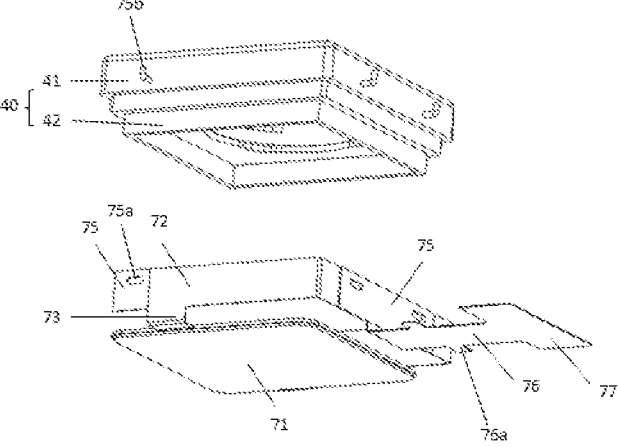
FIG. 19 is an exploded view illustrating the second driving part being disassembled with the photosensitive assembly according to an embodiment of the present invention.

FIG. 18 is a perspective view illustrating a second driving part assembled with a photosensitive assembly in one embodiment of the present application. FIG. 19 is an exploded schematic view of the second driving part and the photosensitive assembly in one embodiment of the present application. FIG. 20 is a perspective view illustrating a photosensitive assembly and its suspended circuit board used in one embodiment of the present application. Referring to FIG. 18, FIG. 19 and FIG. 20, in the camera module of the embodiment, the photosensitive assembly 20 is connected with the movable portion 42 of the second driving part 40, so the circuit board body 71 can be driven by the movable portion 42 to move in xoy Move in the plane. The circuit board 23 in this embodiment is designed as a suspended structure. Specifically, the circuit board 23 comprises a rigid circuit board body 71 and a flexible connecting band 72, and the connecting band 72 may comprise a third connecting band 72a and a fourth connecting band 72b, the third connecting band 72a and the fourth connecting band 72a can be extended from two opposite sides of the circuit board body 71 (for convenience of description, these two opposite sides can be referred to as a first side 74a and a second side 74b) and are bent upward. The bent third connecting band 72a and the fourth connecting band 72b can respectively form a suspending portion 75. The suspending portion 75 can be connected with the base portion of the second driving part 40 (or the first driving part 30), so as to form a suspension structure. The suspension structure allows the base portion to suspend the circuit board body 71 and the various components mounted on its surface (i.e., suspend the photosensitive assembly 20) through a bending portion 73 of the flexible connecting band 72. Specifically, in one example, the suspending portion 75 may have a through hole (suspension hole 75a), and the base portion 41 of the second driving part 40 may have a corresponding hook 75b, and the hook 75b hooks at the through hole of the suspending portion 75, so as to be connected to the suspending portion 75. In the prior art, the connecting band and the circuit board body are usually in the same plane, and at this time, the deflection of the connecting band with respect to the circuit board body in the same plane will generate relatively large resistance. However, in this embodiment, the connection position between the connecting band 72 and the circuit board body 71 is provided with a bending portion 73 formed by bending upwardly, so that the resistance generated from the connecting band 72 moving with respect to the circuit board body 71 in xoy plane is relatively small.

Further, in an embodiment of the present application, the third connecting band 72a and the fourth connecting band 72b may extend along the periphery of the circuit board body 71 and the photosensitive assembly 20, so that the connection band 72 surrounds the photosensitive assembly on at least three sides. In addition, the third connecting band 72a and the fourth connecting band 72b are connected to each other and electrically conducted, wherein the photosensitive assembly 20 has a first side 74a and a second side 74b that are in the same position as the circuit board body 71. The first side 74a and the second side 74b are opposite to each other (that is, they do not intersect with each other), and the third side 74c of the photosensitive assembly 20 intersects with both the first side 74a and the second side 74b. The connecting band 72 can surround the first side 74a, the second side 74b and the third side 74c of the photosensitive assembly 20. The third connecting band 72a is extended from the first side 74a of the circuit board body 71 and bent upward to form the bending portion 73, and then extended along the first side 74a of the photosensitive assembly 20, and at the corner, it is bent in the horizontal direction and continues to extend along the third side 74c. The fourth connecting band 72b is extended from the second side 74b of the circuit board body 71 and bent upward to form another bending portion 73, and then extends along the second side 74b of the photosensitive assembly 20, and at the corner it is bent horizontally and continues to extend along the third side 74c. The third connecting band 72a and the fourth connecting band 72b can be joined at the third side 74c and communicate with each other, so as to form an integral connecting band 72. The three connecting band segments located at the first side 74a, the second side 74b and the third side 74c may respectively be provided with at least one suspending portion 75, and each of the suspending portions 75 has at least one through hole so as to be engaged with the base portion 41 of the second driving part 40 (or the first driving part 30). In this embodiment, the suspending portion 75 can suspend the circuit board body 71 through the bending portion 73 located on opposite sides of the circuit board body 71, so that when the circuit board body 71 is driven by the second driving part 40, the bending portion 73 and the connecting band 72 can be bent and deformed to satisfy the movement stroke of the circuit board body 71.

Further, in one embodiment of the present application, the bending portion 73 of the three connecting band segments located on the first side 74a, the second side 74b and the third side 74c may all be reinforced by a rigid substrate. For example, a rigid substrate may be attached to a part of the flexible connecting band to form the bending portion 73, the other areas of the flexible connecting band are still in a flexible state, so as to be able to undergo bending deformation to meet the movement stroke of the circuit board body 71.

In addition, in an embodiment of the present application, the section of the connecting band located on the third side 74c may have a rigid suspending portion 75c, and a fifth connecting band 76 is extended from the suspending portion 75c, and the fifth connecting band 76 can be used to connect with the main board of an electronic device such as a mobile phone.

Further, in another embodiment of the present application, the suspending portion may also be connected to an outer bracket (not shown in the figure), and the outer bracket is directly or indirectly fixed to the base portion of the second driving part together. In this application, the suspending portion may be fixed together with the base portion of the second driving part through other intermediaries which can be directly or indirectly fixed to the base portion of the second driving part. The intermediary comprises a hook for hooking the suspending portion, or the intermediary is glued to the suspending portion. The intermediary can be the outer bracket, the base portion of the first driving part, or other intermediaries.

In addition, in another embodiment of the present application, the suspending portion may not have the through hole. In this embodiment, the suspending portion may be fixed together with the base portion of the second driving part (or with the base portion of the first driving part or the outer bracket) by bonding. Further, in another embodiment of the present application, each of the third connecting band and the fourth connecting band may be a rigid-flex board, wherein the part forming the suspending portion may be a rigid board, and the connecting part for connecting the suspending portion and the bending portion formed by bending upwardly can be made of a flexible board. Since the suspending portion is directly formed by a rigid board, the suspending portion may not be reinforced by attaching a rigid substrate in this embodiment.

Further, in an embodiment of the present application, the circuit board body, the third connecting band and the fourth connecting band may be formed by an integral rigid-flex board.

Further, still referring to FIG. 18, FIG. 19 and FIG. 20, in one embodiment of the present application, the circuit board may also comprise a fixing portion 76a for fixing the fifth connecting band 76, this design can avoid the circuit board body 71, the third connecting band 72a and the fourth connecting band 72b to be affected by external factors.

In addition, FIG. 21a is a schematic view illustrating a front side of the unfolded suspended circuit board in an embodiment of the present application; FIG. 21b is a schematic view illustrating a back side of the suspended circuit board in an embodiment of the present application after deployment.

Referring to FIG. 21a and FIG. 21b, in this embodiment, the circuit board 23 may be composed of a rigid-flex board, wherein the sections of the third connecting band 72a and the fourth connecting band 72b located on the third side 74c can be fastened with each other through connectors 78, 79 (referring to FIG. 20), so that the third connecting band 72a is connected and fixed with the fourth connecting band 72b to further realize electrical connection. Both the third connecting band 72a and the fourth connecting band 72b are provided with circuits, so as to lead the circuit in the circuit board body 71 outwardly, and then connect the external circuit through the fifth connecting band 76 and its connector 77. Since the third connecting band 72a and the fourth connecting band 72b can each lead out a part of the circuit through the corresponding bending portion 73 formed by bending upwards, the circuit that need to be drawn out of each bending portion 73 can be reduced, in this way, the width of each bending portion 73 can be reduced, thereby further reducing the resistance formed by the flexible connecting band 72 to the movement of the circuit board body 71, thereby reducing the driving force required to be provided by the second driving part 40. It should be noted that in other embodiments of the present application, the circuit of the circuit board body can also be lead out from one of the bending portions (for example, the bending portion of the third connecting band or the u bending portion of the fourth connecting band which are bent upwardly).

In the above embodiments, the base of the second driving part is located between the lens and the photosensitive assembly, but the application is not limited thereto. In some other embodiments, the base of the second driving part may be located below the photosensitive assembly. The solution that the base of the second driving part is located below the photosensitive assembly will be further described below with reference to FIGS. 22 to 36 and a series of embodiments.

FIG. 22 is a sectional view of a camera module with an optical image stabilization function according to an embodiment of the present application. Referring to FIG. 22, in this embodiment, the camera module comprises a lens 10, a photosensitive assembly 20, a first driving part 30 and a second driving part 40. The photosensitive assembly 20 comprises a photosensitive chip 21. The first driving part 30 is configured to drive the lens 10 to move in two directions of x-axis and y-axis, and the second driving part 40 is configured to drive the photosensitive chip 21 to move in two directions of x-axis and y-axis. In this embodiment, the x and y directions are perpendicular to each other and parallel to a photosensitive surface of the photosensitive assembly 20. The z direction is parallel to the normal direction of the photosensitive surface. For ease of understanding, FIG. 22 also shows a three-dimensional Cartesian coordinate system constructed based on the x, y, and z directions. In this embodiment, the optical image stabilization of the camera module is achieved by simultaneously driving the lens 10 and the photosensitive chip 21 to move in opposite directions by a control module. Specifically, the lens 10 and the photosensitive chip 21 are configured to be driven simultaneously and move in opposite directions. For example, when the lens 10 is driven to move toward the positive direction of the x-axis, the photosensitive chip 21 is driven to move toward the negative direction of the x-axis; when the lens 10 is driven to move toward the positive direction of the y-axis, the photosensitive chip 21 is driven to move toward the negative direction of the y-axis; when the lens 10 is driven to move in directions of x-axis and y-axis, the photosensitive chip 21 is driven to move toward the opposite directions of the moving directions of the lens 10. In other words, when simultaneous movement along both the x-axis and the y-axis is required, the displacement vector of the lens 10 and the displacement vector of the photosensitive chip 21 in the xoy plane are opposite. The camera module usually comprises a position sensor, and the position sensor is used to detect shaking of the camera module or a terminal device (that is, an electronic device equipped with the camera module, such as a mobile phone). When shaking is detected, the position sensor sends a signal to the camera module to drive the lens 10 and the photosensitive chip 21 to make corresponding movements to compensate for the shaking, so as to achieve the purpose of optical image stabilization. In this embodiment, the lens 10 and the photosensitive chip 21 are configured to move simultaneously, and the lens 10 and the photosensitive chip 21 move in opposite directions, which can achieve faster response and better optical image stabilization performance. In addition, usually the optical image stabilization angle range of the camera module is limited by the suspension system and the drive system, and it is impossible to achieve a relatively large compensation angle range. In this embodiment, the lens 10 and the photosensitive chip 21 are driven to move in opposite directions to achieve a large-angle shaking compensation. In addition, in this embodiment, by driving the lens 10 or the photosensitive chip 21 to move in opposite directions simultaneously, compared with the solution of only driving the lens 10 to move, there is a larger relative movement stroke between the lens 10 and the photosensitive chip 21 (for the convenience of description, this relative movement stroke can be referred to as the optical image stabilization stroke), which can have a better compensation effect. In particular, due to the increase of the optical image stabilization stroke, this embodiment also has a better compensation effect on the tilt shake of the camera module. Further, the movement direction of the optical image stabilization movement in this embodiment can be limited in the xoy plane without tilting the optical axis of the lens 10 or the photosensitive chip 21, thereby avoiding the blurring problem caused by the optical image stabilization movement.

Further, in another embodiment of the present application, the photosensitive chip 21 can also be driven to rotate in the xoy plane by the second driving part 40, so as to realize compensation for shaking in the rotation direction of the camera module.

In addition, referring to FIG. 22, in an embodiment of the present application, the camera module comprises a first driving part 30, a lens 10, a second driving part 40 and a photosensitive assembly 20. The lens 10 is mounted on the first driving part 30. The first driving part 30 may comprise a cylindrical first motor carrier, and the first motor carrier may serve as a movable portion of the first driving part, and the lens is installed on an inner surface of the first motor carrier. The first driving part also comprises a stationary portion, or called a base portion. In this embodiment, the base portion may be implemented as a motor housing. The motor housing may comprise a base and a cover. The base has a light hole. The movable portion is movably connected with the base portion. The driving element may be a coil-magnet assembly, which may be mounted between the movable portion and the base portion. For example, it can be installed between the first motor carrier and the motor housing. In fact, the first driving part in this embodiment can directly adopt the common structure of the optical image stabilization motor in the prior art. Further, in this embodiment, the second driving part 40 may also comprises a base portion and a movable portion, wherein the base portion may comprise a base plate and a side wall of the base portion, the bottom of the side wall of the base portion is connected to the base plate, and the top of the side wall of the base portion is connected to the base portion of the first driving part. For the convenience of description, the base portion of the first driving part 30 is sometimes called the first base portion, the base portion of the second driving part 40 is called the second base portion, and the movable portion of the first driving part 30 is called the first movable portion. The movable portion of the second driving part 40 is called the second movable portion. In this embodiment, the second movable portion is located above the base plate of the second base portion, and is movably connected with the second base portion through a ball structure. The photosensitive assembly 20 comprises a circuit board 23, a photosensitive chip 21 installed on a surface of the circuit board, and a lens holder 22 surrounding the photosensitive chip 21. A bottom of the lens holder 22 can be installed on the surface of the circuit board 23. The center of the lens holder 22 has a light hole, and a light filter 24 is mounted on the lens holder 22 (the light filter 24 can also be regarded as a component of the photosensitive assembly 20). The bottom surface of the circuit board may be fixed (i.e. bonded) to the upper surface of the second movable portion. In this way, driven by the second movable portion, the photosensitive assembly 20 can translate with respect to the base portion in the x and y directions or rotate in the xoy plane. On the other hand, in this embodiment, since the second movable portion can be arranged on the back of the circuit board, the bases of the second movable portion and the second base portion do not need to be provided with light holes. In this way, at the same structural strength, in this case, the second movable portion can be designed to be lighter and thinner, which is beneficial to the miniaturization of the camera module. For ease of understanding, a comparative example will be described below.

Figure 23:
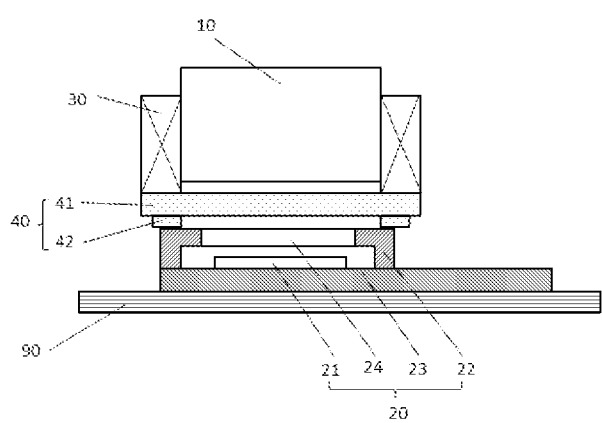
FIG. 23 is a sectional view illustrating a comparative example of the camera module with the optical image stabilization function according to another embodiment of the present invention.

FIG. 23 is a sectional view of a comparative example of a camera module with an optical image stabilization function according to another embodiment of the present application. In this comparative example, the camera module comprises a first driving part 30, a lens 10, a second driving part 40 and a photosensitive assembly 20. The lens 10 is mounted on the first driving part 30. The structure and assembly method of the first driving part 30 and the lens 10 may be consistent with the previous embodiment shown in FIG. 22, and will not be repeated here. The difference between this comparative example and the previous embodiment is that: the second driving part 40 is located between the lens 10 and the photosensitive assembly 20, wherein the second base portion 41 can be directly fixed on the bottom surface of the first base portion, and the second movable portion 42 is located below the second base portion 41 and is flexibly connected with the second base portion 41, so that the second movable portion 42 can move with respect to the second base portion 41 in the xoy plane. The photosensitive assembly 20 is installed under the second movable portion 42, wherein the top surface of the lens holder 22 of the photosensitive assembly 20 is connected and fixed to the bottom surface of the second movable portion 42, so that the photosensitive assembly 20 can be driven by the second movable portion 42 and translate in the x, y directions or rotates in the xoy plane with respect to the second base portion 41, wherein the circuit board 23 of the photosensitive assembly 20 is supported by the main board 90 of the electronic device (such as a mobile phone). The light filter 24 can be mounted on the lens holder 22. In this comparative example, since both the second base portion 41 and the second movable portion 42 are located on the imaging optical path, both the second base portion 41 and the second movable portion 42 need to be provided with a light hole in the center so that light can pass through. In this way, in order to maintain the required structural strength, the thickness of the second base portion 41 and the second movable portion 42 must be increased, which may lead to an increase in the height of the camera module. In the above-mentioned embodiment based on FIG. 22, the bases of the second base portion 41 and the second movable portion 42 are both arranged on the back side of the circuit board of the photosensitive assembly 20, so under the premise of the same structural strength, both the thickness of the base of the second base portion 41 and the thickness of the second movable portion 42 can be reduced, which helps to reduce the height of the camera module and helps realize the miniaturization of the camera module.

Figure 36:
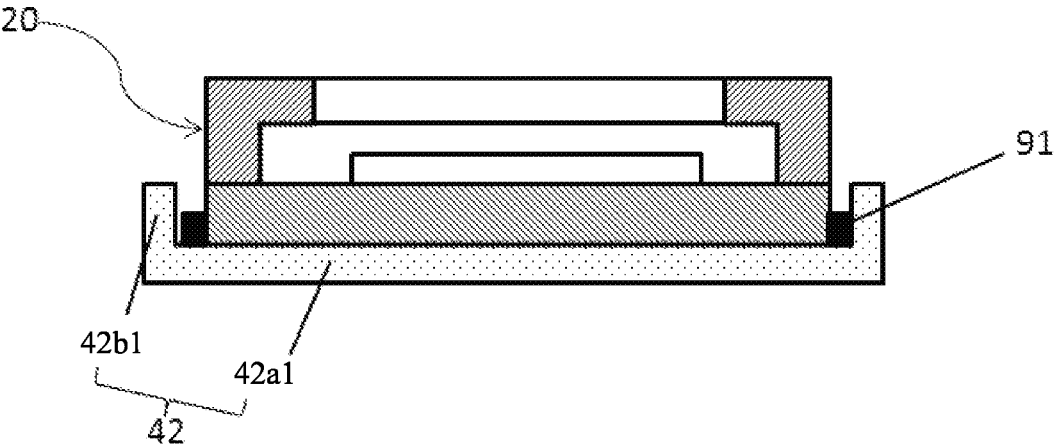
FIG. 36 is a schematic view illustrating the connection between a photosensitive assembly and a second movable portion according to another embodiment of the present invention.

It should be noted that the second movable portion 42 in FIG. 22 is flat, and a bottom surface of the circuit board 23 of the photosensitive assembly 20 can be glued to an upper surface of the second movable portion 42. But this design is not the only solution of the present application. For example, FIG. 36 is a schematic view illustrating the connection between the photosensitive assembly and the second movable portion in another embodiment of the present application. Referring to FIG. 36, in this embodiment, the second movable portion 42 may comprise a movable portion bottom plate 42a1 and a movable portion side wall 42b1, and the movable portion side wall 42b1 is upwardly extended from the edge area of the movable portion bottom plate 42a1. The photosensitive assembly 20 can be placed in the receiving groove formed by the movable portion bottom plate 42a1 of the movable portion side wall 42*b*1 of the movable portion. The glue 91 can be arranged between the inner surface of the side wall 42*b* of the movable portion and the outer surface of the photosensitive assembly 20, that is, in this embodiment, the second movable portion 42 and the photosensitive assembly 20 are fixed together by arranging a glue on the side thereof.

Figure 24:
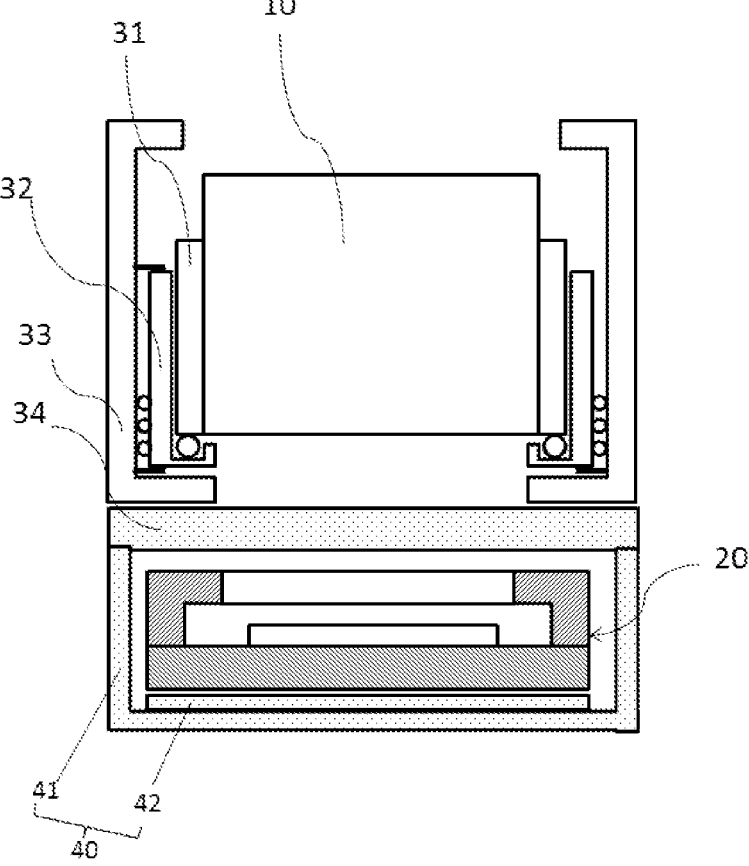
FIG. 24 is a sectional view illustrating a camera module according to an embodiment of the present invention.

Further, FIG. 24 is a sectional view of a camera module in an embodiment of the present application. Referring to FIG. 24, in this embodiment, the second base portion 41 of the second driving part 40 is fixed to the first base portion of the first driving part 30 (the first base portion may be jointly constituted by a housing 33 and a first base 34). The lens 10 can be installed on the first movable portion of the first driving part 30 (for example, it can be installed on the first motor carrier 31 of the first movable portion). The photosensitive assembly 20 comprises a circuit board 23, a photosensitive chip 21, a lens holder 22, a light filter 24 and the like. The photosensitive assembly 20 can be mounted on the second movable portion 42 of the second driving part 40. Specifically, the bottom surface of the moving portion 42 can be supported on a top surface of the lens holder 22 of the photosensitive assembly 20, wherein in the second driving part 40, the second base portion 41 and the second movable portion 42 can be elastically connected through a suspension system. In this embodiment, the suspension system allows the second movable portion 42 to translate in the xoy plane with respect to the second base portion 41. Optionally, the suspension system may be a ball system, which has the advantage that: in the z direction, the second movable portion 42 and the second base portion 41 are in contact with the ball, and the second movable portion 42 only moves in the xoy plane, the movement in the direction of the optical axis (i.e., the z-axis direction) can be prevented by the ball between the second movable portion 42 and the second base portion 41, so as to avoid affecting the focus of the camera module.

Optionally, in another embodiment, the suspension system may comprise an elastic element (such as a spring), the fixed portion and the movable portion are connected through the elastic element which allows the movable portion to be translate in the xoy plane with respect to the base portion, but prevents movement of the movable portion with respect to the base portion outside the xoy plane. Compared with the ball system, the advantage of setting the elastic element is that the elastic element can provide an initial force between the base portion and the movable portion, and the initial force can control the movement distance of the movable portion or maintain its position by cooperating with the driving force of the driving element, there is no need to set additional driving elements to provide conjugate driving force to control the position of the movable portion. If a ball system is used, the movable portion is free to move in the xoy direction with respect to the base portion when the driving element does not provide a driving force, so it is often necessary to provide at least one pair of mutually opposite driving forces to control and keep the movable portion stay in its initial position.

Further, still referring to FIG. 24, in an embodiment of the present application, optical image stabilization can be realized by driving the entire photosensitive assembly 20 to move. Simultaneously, the circuit board 23, the photosensitive chip 21, the lens holder 22, the light filter 24 are packaged as a whole, and the circuit board 23, the lens holder 22, the light filter 24 form a closed space, and the photosensitive chip 21 is accommodated in this closed space, so as to improve the sealing effect of the photosensitive assembly 20 to ensure that the imaging of the photosensitive chip 21 is not affected by dust during the production or use of the camera module.

Still referring to FIG. 24, in one embodiment of the present application, the first driving part 30 is implemented to be suitable for driving the lens 10 to move in the direction of the optical axis to realize the focusing function, and is also suitable for driving the lens 10 to move in the xoy plane to realize the optical image stabilization function. Optionally, the first driving part 30 comprises at least two carriers, namely a first carrier 31 and a second carrier 32, the lens 10 is seated on the first carrier 31, and a suspension system is provided between the first carrier 31 and the second carrier 32, and another suspension system is provided between the second carrier 32 and the housing 33 of the first driving part 30. In this embodiment, the suspension system (i.e. the first suspension system) between the first carrier 31 and the second carrier 32 is set to a ball system, and the suspension system (i.e. the second suspension system) between the second carrier 32 and the housing 33 can be a ball structure (the ball structure may include, for example, a vertical groove and a plurality of balls arranged in the vertical groove), or it may be a suspension system based on elastic elements (such as elastic sheets). A bottom surface of the housing 33 can be installed on the first base 34, and the first base 34 and the housing 33 can jointly constitute the first base portion of the first driving part 30. In this embodiment, the second suspension system is arranged outside the first suspension system. The first suspension system allows the lens 10 and the first carrier 31 to translate in the xoy plane to realize the optical image stabilization function. The second suspension system allows the lens 10, the first carrier 31 and the second carrier 32 integrally move in the direction of the optical axis to realize the focusing function. Optionally, in another embodiment, the second suspension system can also be arranged inside the first suspension system. In another modified embodiment, the second suspension system can also be arranged below the first suspension system. In this embodiment, the suspension system refers to a system in which two components are movably connected, and the degree of freedom of relative movement (i.e., the direction of movement) of the two components is limited to a certain extent. These two movably connected components can be called as a base portion and a movable portion respectively. Typically, suspension systems are used with driving elements such as SMA elements or coil-magnet assemblies, wherein the driving force is provided by the driving element, under the action of the driving force, the movable part moves with respect to the base portion in the moving direction defined by the suspension system.

Figure 27:
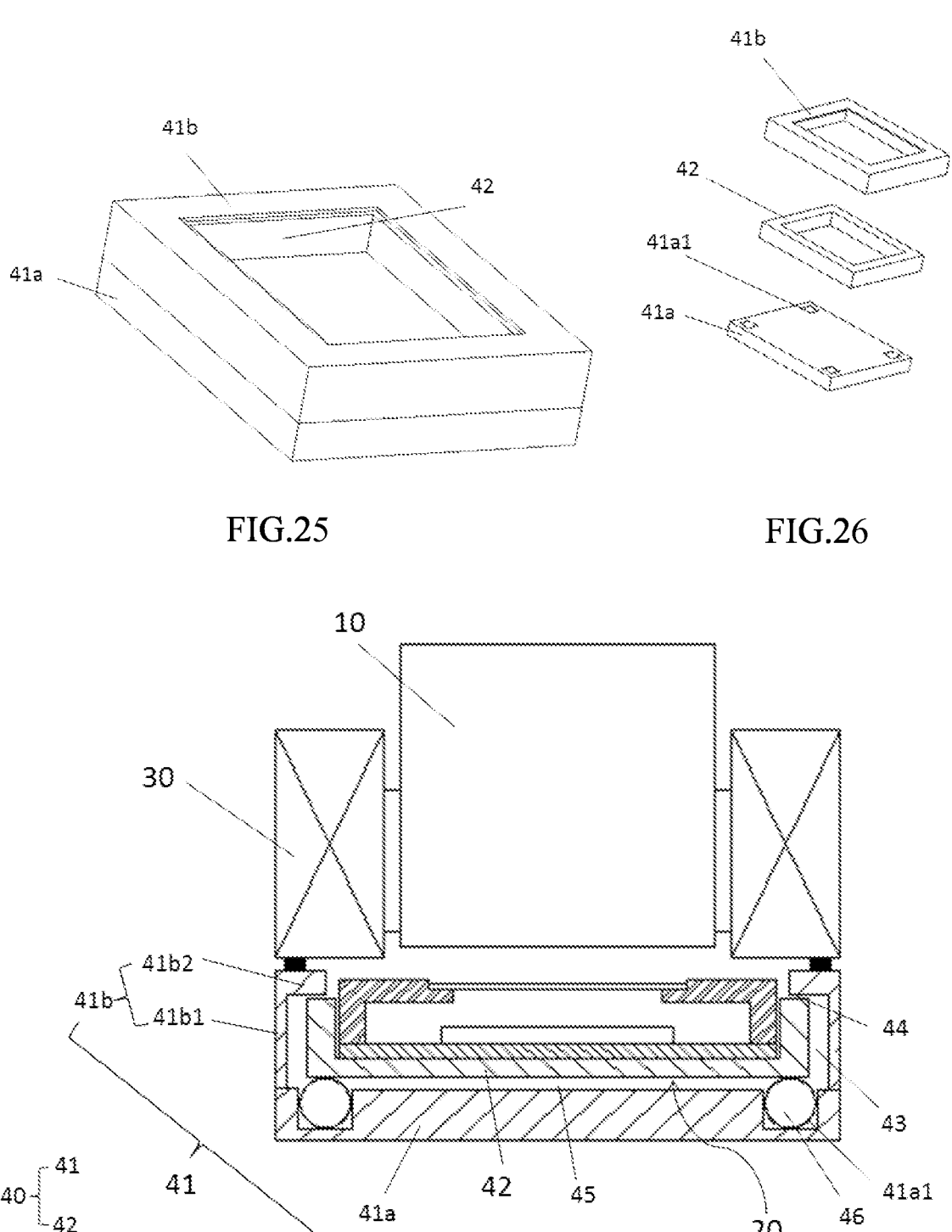
FIG. 27 is a sectional view illustrating a camera module according to an embodiment of the present invention.

Further, FIG. 25 is a perspective view of the second driving part according to an embodiment of the present application. FIG. 26 is an exploded view of the second driving part according to the embodiment of the present application. Further, FIG. 27 is a sectional view of a camera module according to an embodiment of the present application, in which a cross-section of the second driving part is shown. Referring to FIG. 27 together with reference to FIG. 25 and FIG. 26, in this embodiment, the second driving part 40 comprises a second base portion 41 and a second movable portion 42. For the convenience of description, in the paragraph introducing the second driving part 40 herein, sometimes the second base portion 41 is referred to as the base portion 41 for short, and the second movable portion 42 is referred to as the movable portion 42 for short, which will not be described in detail below. In this embodiment, the base portion 41 comprises a base 41*a* and a cover 41*b*. In this embodiment, the base 41*a* can be in the form of a flat plate, so it can also be called a bottom plate. The cover 41*b* comprises a cover side wall 41*b*1 and a supporting platform 41*b*2 which is inwardly extended from a top of cover side wall 41*b*1, the movable portion 42 is located between the supporting platform 41*b*2 and the base 41*a*, the four corners of the base 41*a* can be provided with grooves 41*a*1, the balls are placed in the grooves 41*a*1. The bottom surface of the movable portion 42 is in contact with the balls and supported by the balls 46, thereby forming a flexible connection between the base portion 41 and the movable portion 42. The supporting platform 41*b*2 and the base 41*a* can clamp the movable portion 42, so as to limit the movement of the movable portion 42 in the z-axis direction. In this way, the degree of freedom of movement of the movable portion 42 with respect to the base portion 41 is limited in the xoy plane. Specifically, the degree of freedom of movement of the movable portion 42 with respect to the base portion 41 may comprise x-axis translation, y-axis translation, and the rotation of the z-axis (i.e. the rotation in the xoy plane). In this embodiment, a groove 41*a*1 is provided at the corresponding position of the ball 46. On the one hand, the ball 46 can be placed in the groove 41*a*1 during the assembling process, thereby facilitating the assembly of the second driving part 40; on the other hand, the groove 41*a*1 can limit the maximum movement distance of the movable portion 42 with respect to the base portion 41 to avoid collisions during the relative movement between the movable portion 42 and the base portion 41. As shown in FIG. 26, in this embodiment, four grooves 41*a*1 can be provided in the upper surface of the base 41*a* of the base portion 41, and there are also four balls 46, which are respectively arranged in the four corners of the second driving part 40 (referring to FIG. 26). Of course, in other embodiments, the grooves and balls can also be arranged on the four sides of the second driving part.

Further, in one embodiment of the present application, in the second driving part 40, there is a first gap 43 formed between the inner side of the side wall of the base portion 41 and the outer side of the movable portion 42, and the first gap 43 is larger than the maximum distance of the optical image stabilization movement of the movable portion 42 (that is, the maximum stroke in one-way, where the one-way can be, for example, the positive direction of the x-axis, the negative direction of the x-axis, the positive direction of the y-axis or the negative direction of the y-axis), the first gap 43 usually can be larger than 200 μm. In this embodiment, the ball structure is used to realize the flexible connection, which can reduce the movement resistance of the movable portion 42, thereby reducing the driving force required to drive the movable portion 42, and then the movable portion 42 can be designed to have a larger stoke. Therefore, in some embodiments, the first gap 43 may be greater than 300 μm.

In addition, in one embodiment of the present application, in the second driving part 40, there may also be a second gap 44 formed between a lower surface of the supporting platform 41*b*2 and the movable portion 42, and the second gap 44 can be smaller than 10 μm to reduce the friction between the movable portion 42 and the supporting platform 41*b*2. This can reduce the frictional resistance and avoid the generation of friction debris. At the same time, because the second gap 44 is small, the supporting platform 41*b*2 can still limit the movable portion 42 in the z-axis direction, so as to avoid the movement of the movable portion 42 from deviating from the xoy plane.

Further, in one embodiment of the present application, in the second driving part 40, there is a third gap 45 formed between a lower surface of the movable portion 42 and an upper surface of the base 41*a*. Typically, the ball diameter is greater than the depth of the groove that accommodates the ball. The third gap 45 may be smaller than 10 μm, for example.

In addition, in one embodiment of the present application, in the second driving part 40, an upper surface of the cover 41*b* (that is, the upper surface of the supporting platform 41*b*2) is higher than a top surface of the photosensitive assembly 20 (lens holder) to prevent the photosensitive assembly 20 from rubbing against the first driving part 30 when moving horizontally.

Figure 28A:
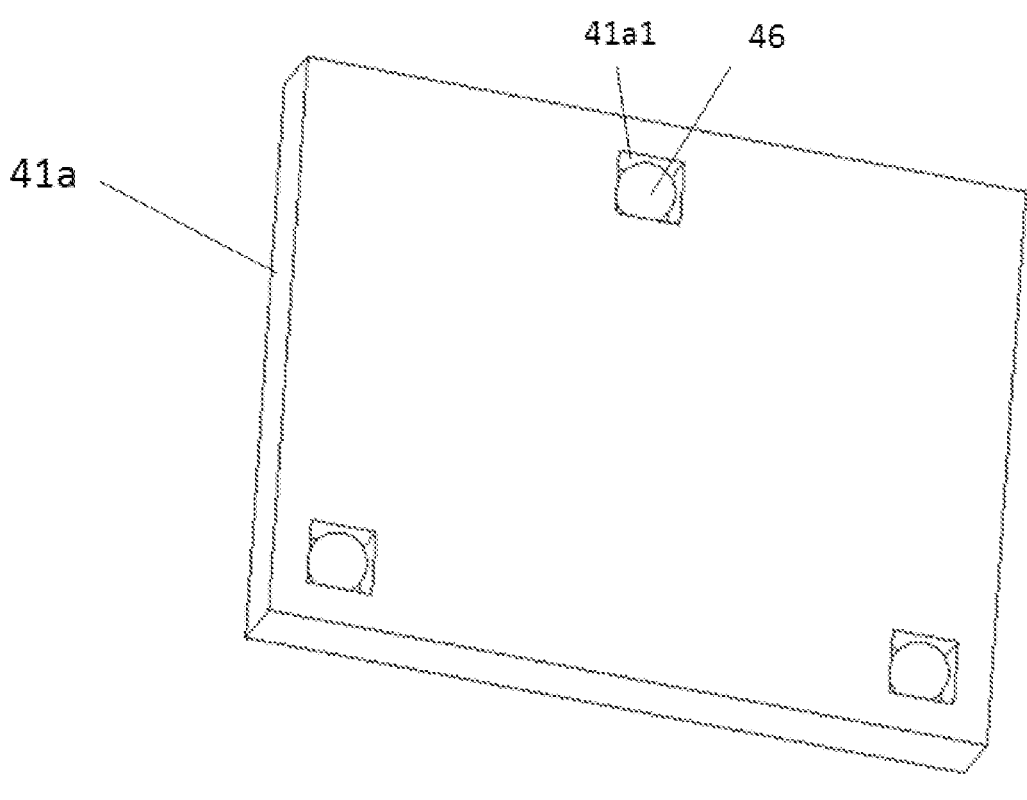
FIG. 28a is a sectional view illustrating a ball structure of a second driving part according to an alternative embodiment of the present invention.
Figure 28B:
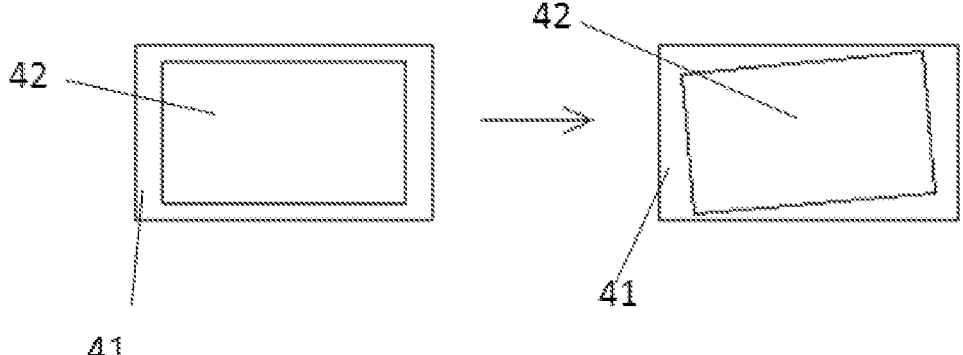
FIG. 28b is a schematic view illustrating a movable pat rotating in the xoy plane.

Further, FIG. 28*a* shows the ball structure of the second driving part in an alternative mode of the present application. Referring to FIG. 28*a*, in this embodiment, the number of balls 46 between the base portion 41 and the movable portion 42 of the second driving part 40 can be three, and the corresponding number of grooves 41*a*1 for accommodating the balls 46 can also be three. In fact, the number of balls and the positions they are arranged are sufficient as long as they can support the movable portion 42 in a reference plane (such as a horizontal plane), wherein the reference plane is the xoy plane. In this embodiment, the bottom surface of the groove 41*a*1 is set as a plane, and the ball can move freely on the bottom surface of the groove 41*a*1, thereby allowing the movable portion 42 to translate in the x-axis and y-axis, and also allowing the movable portion 42 to translate in the xoy plane and rotation (as shown in FIG. 28*b*, which shows the movable portion rotating in the xoy plane). On the other hand, referring to FIG. 27, in this embodiment, the ball 46 is arranged below the photosensitive assembly 20, that is, the projections of the ball 46 and the photosensitive assembly 20 on the reference plane at least partially overlap, or in other words, viewed from a top view, the ball 46 is completely located within the projection range of the photosensitive assembly 20 or at least partially within the projection range of the photosensitive assembly 20. This design can prevent the ball mechanism from occupying extra space in the radial direction of the camera module (that is, the x-axis or y-axis direction), and helps to reduce the lateral dimension of the second driving part 40 (that is, the dimension in the x-axis or y-axis direction), so that it is beneficial to the miniaturization of the module.

Figure 29:
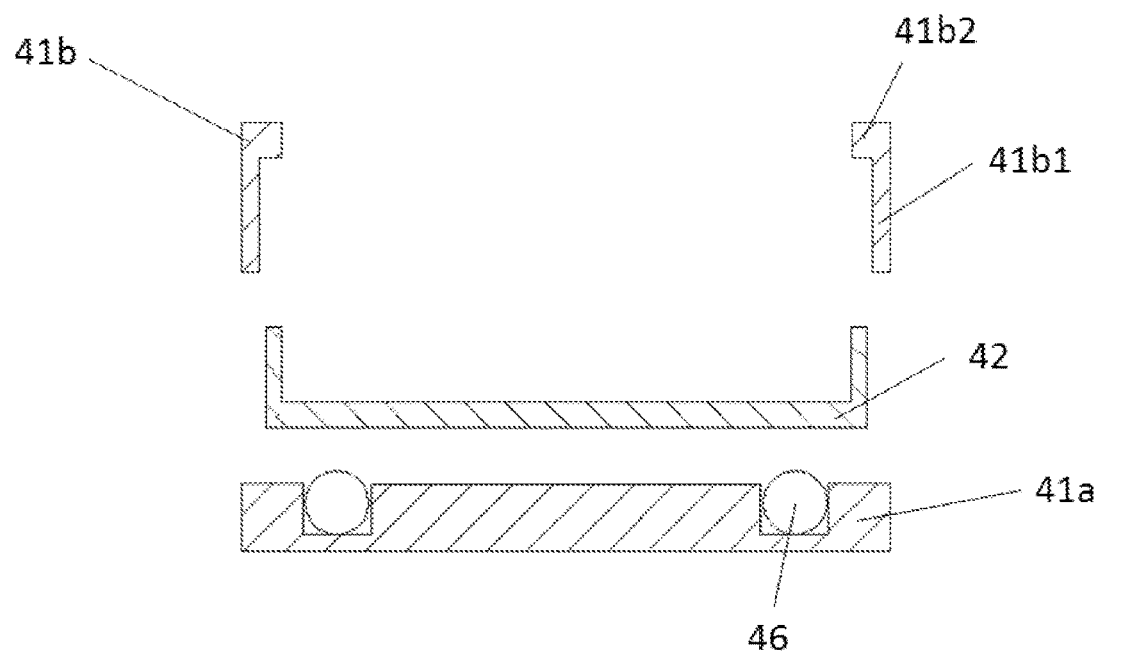
FIG. 29 is a schematic view illustrating a typical assembling manner of the second driving pat according to an embodiment of the present invention.

In more details, FIG. 29 is a schematic diagram illustrating a typical assembly manner of the second driving part according to an embodiment of the present application. Referring to FIG. 29, in this embodiment, the second driving part 40 can be assembled by three main components separated from each other, these three components are respectively the base 41*a*, the cover 41*b* and the movable portion 42, and they can be assembled in the vertical direction. For example, the base 41*a* with the balls 46 can be arranged on an assembly platform first, then the movable portion 42 is placed on the base 41*a* so that it is supported by the balls 46 in the base 41*a*, and finally the cover 41*b* moves to the top of the base 41*a* and the movable portion 42, and then moves the cover 41*b* downward so that the bottom surface of the cover side wall 41*b*1 is close to the top surface of the base 41*a*, and then the bottom surface of the cover side wall 41*b*1 is connected to the base 41*a*, thereby completing the assembly of the second driving part 40. In FIG. 29, the base 41*a* is in the shape of a flat plate without a side wall of the base, so it can also be called a base plate or a bottom plate. However, it should be noted that in other embodiments, the base 41*a* can also be composed of the side wall of the base and the base plate. Based on this base, it can be assembled into a second driving part as shown in FIG. 13*b*, and the assembling method may be the same as that shown in FIG. 29. That is, the base, the cover, and the movable portion are prepared as three main components separated from each other, and then the three are assembled vertically.

Figure 30:
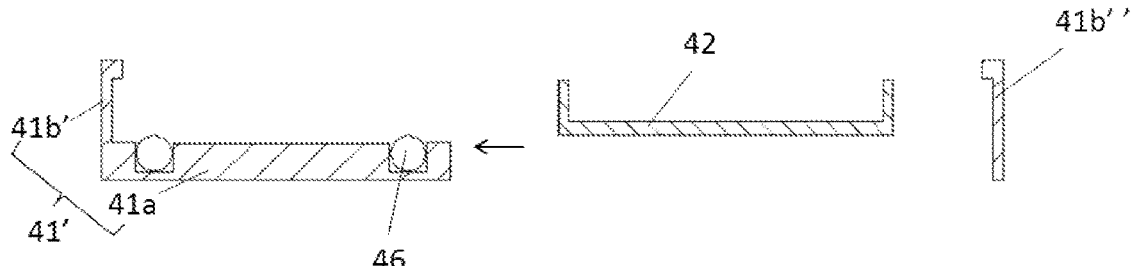
FIG. 30 is a schematic view illustrating exploded state of the second driving pat which has not been assembled according to another embodiment of the present invention.
Figure 31:
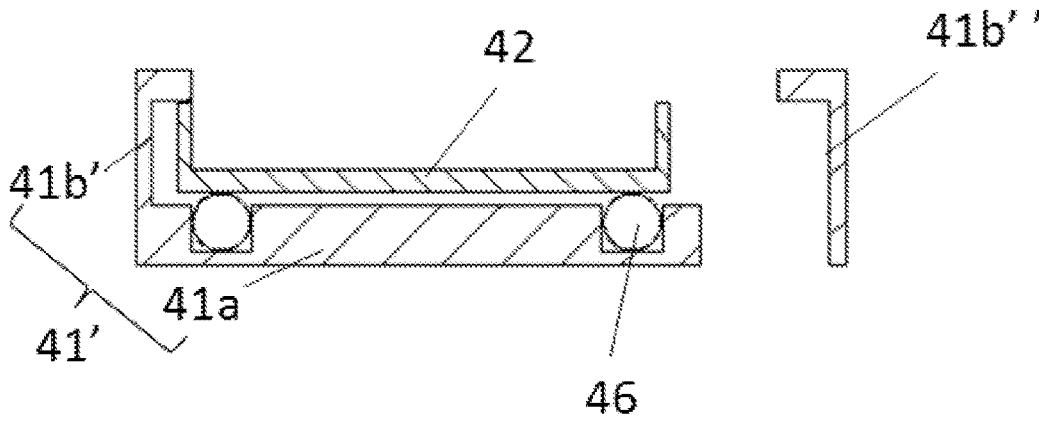
FIG. 31 is a schematic view illustrating a middle state during the assembling process of a second driving pat according to another embodiment of the present invention.

FIG. 30 is an exploded view of the second driving part before assembly according to another embodiment of the present application. FIG. 31 is a schematic view illustrating an intermediate state during the assembling process of the second driving part in another embodiment of the present application. In this embodiment, the second driving part 40 may be assembled in a lateral assembly manner. Specifically, three separate main members of a base body 41', a movable portion 42, and a side cover 41b" may be prepared (referring to FIG. 30). The base body 41' may comprise a base 41a and a cover body 41b' connected to the base 41a (in some embodiments, the base 41a and the cover body 41b' may be integrally formed), the cover body 41b' is a part of the integral cover 41b, and it forms the integral cover 41b together with the side cover 41b". In this embodiment, the cover main body 41b' may, for example, surround the movable portion 42 (or the photosensitive assembly) on three sides, and the other side is left for the movable portion 42 (or the combination of the movable portion 42 and the photosensitive assembly) to be inserted into a gap of the base body 41' laterally. The side cover 41b" corresponds to the gap. After the combination of the movable portion 42 and the photosensitive assembly is inserted through the gap (referring to FIGS. 30 and 31), the side cover 41b" can be approached from the side to the base 41a, and the outer surface of the base 41a and the inner surface of the side cover 41b" are bonded together to form an integral second driving part 40. In this way of bonding and fixing from the lateral side, the parallelism of the upper and lower end surfaces of the base portion 41 is only determined by the manufacturing accuracy of the base portion 41 itself, so this way of bonding and fixing from the lateral side can improve the parallelism between the upper and lower end surfaces of the base portion 41 as well as the parallelism between the upper end surface of the base portion 41 and the movable portion 42.

Figure 32:
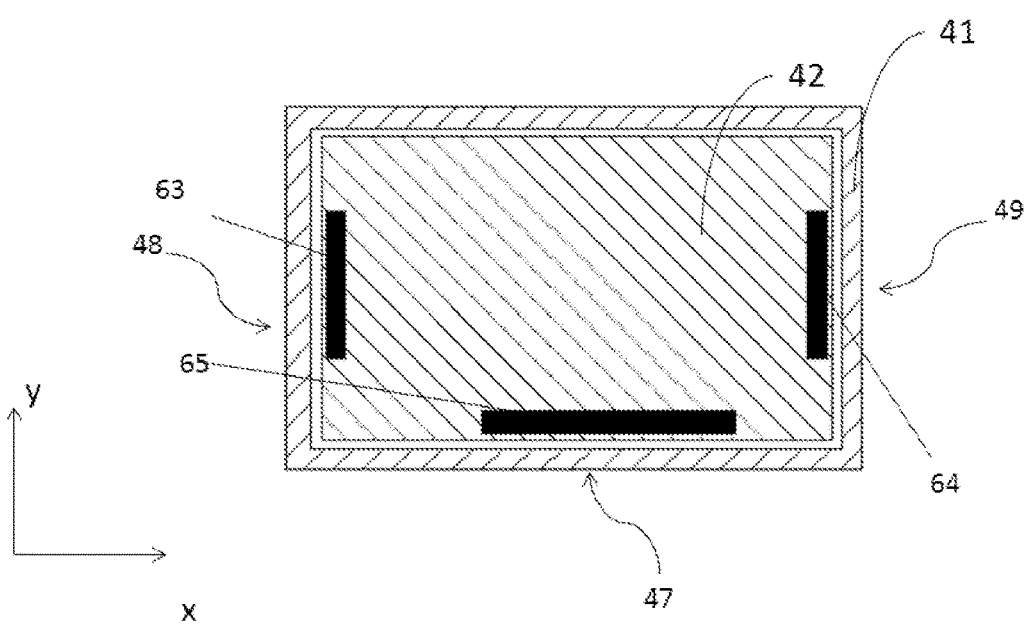
FIG. 32 is a top view illustrating an assembling position of a driving element of a second driving part according to an embodiment of the present invention.
Figure 33A:
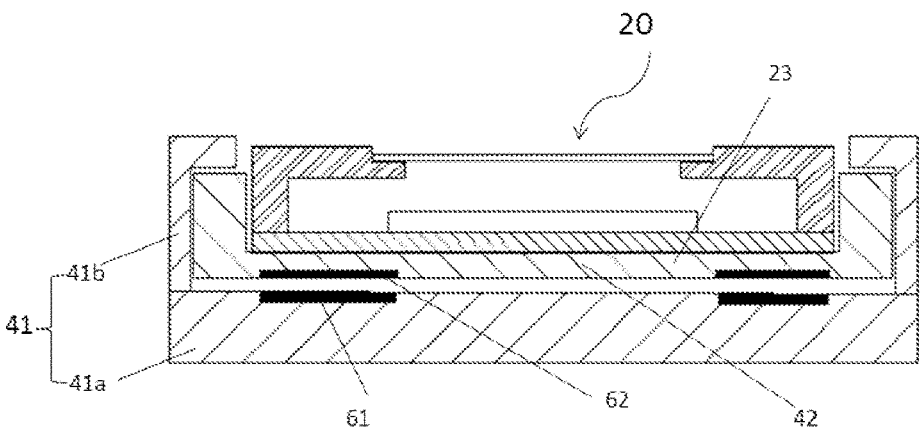
FIG. 33a is a sectional view illustrating a second driving part comprising a driving element according to an embodiment of the present invention.

Further, FIG. 32 shows an installation position of the driving element of the second driving part in a plan view according to an embodiment of the present application. FIG. 33a is a sectional view illustrating the second driving part comprising the driving element according to the embodiment of the present application. Referring to FIG. 32 and FIG. 33a, in one embodiment of the present application, the driving element of the second driving part 40 is a coil-magnet assembly, wherein a magnet 61 can be arranged on an edge area of a bottom plate of the base portion 41 (i.e. the base 41a), and the coil 62 can be arranged on an edge area of a movable portion bottom plate of the movable portion 42. In this embodiment, the magnet can be disposed on the bottom plate of the base portion 41. Further, a coil 62 can be soldered and conducted with the circuit board 23 of the photosensitive assembly 20 through the FPC board (flexible board) disposed on the movable portion 42. The advantage of arranging the coil 62 on the movable portion 42 is that the movable portion 42 and the photosensitive assembly 20 move synchronously during the optical image stabilization process, and the coil 62 is welded to the circuit board 23 through the FPC board to ensure that there is no relative movement between wires or the welded parts, thereby reducing the risk of electrical failure at the welding positions. It should be noted that the connection method through the FPC board is not the only electrical connection method in this application. In another embodiment, the coil can also be electrically connected to the bottom surface of the circuit board through the contact or contact array arranged on the upper surface of the movable portion. The arrangement of the driving element shown in FIG. 33a facilitates to reduce the lateral size (i.e. the size perpendicular to the optical axis) of the camera module.

Figure 33B:
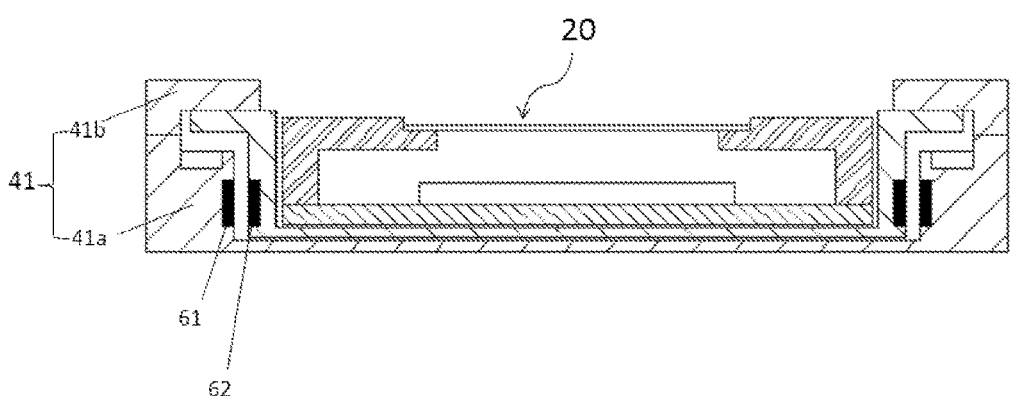
FIG. 33b is a sectional view illustrating a second driving part comprising a driving element according to another embodiment of the present invention.

Further, FIG. 33b is a sectional view illustrating the second driving part comprising the driving element according to another embodiment of the present application. In this embodiment, the coil 62 and the magnet 61 can be disposed on the side walls of the movable portion 42 and the base portion 41. This design is beneficial to reduce the thickness of the second driving part 40, thereby reducing the height of the camera module. Specifically, in this embodiment, the magnet 61 is arranged on the base 41a of the base portion 41 instead of the cover 41b, and this design can reserve the connection (may be bonding) area between the base portion 41 and the first driving part 30.

Still referring to FIG. 32, in one embodiment of the present application, preferably, three coil magnet pairs (one coil magnet pair is one coil-magnet assembly), which are respectively called a first coil magnet pair 63, a second coil magnet pair 64 and a third coil magnet pair 65, wherein the first coil magnet pair 63 and the second coil magnet pair 64 are used to drive the translation of the movable portion 42 in the x-axis direction, that is, to provide a driving force in the x-axis direction. The third coil magnet pair 65 is used to drive the translation of the movable portion 42 in the y-axis direction, that is, to provide a driving force in the y-axis direction. In a top view (or bottom view), the first coil magnet pair 63 and the second coil magnet pair 64 can be respectively arranged along two opposite sides of the second driving part, and these two opposite sides can be referred to as first side 48 and a second side 49, the first side 48 and second side 49 do not intersect. And the second coil magnet pair 64 can be arranged along a third side 47 of the second driving part, and the third side 47 intersects with both the first side 48 and the second side 49. In this embodiment, the three coil magnet pairs can not only realize x-axis translation and y-axis translation, but also can realize rotation in the xoy plane. For example, when the first coil magnet pair 63 and the second coil magnet pair 64 provide driving forces in opposite directions, a combined driving force for rotating the movable part in the xoy plane can be generated. It should be noted that the way to provide the driving force for the rotation in the xoy plane is not unique. For example, the first coil magnet pair 63 and the third coil magnet pair 65 can also produce a driving force for actuating the rotation of the movable portion in the xoy plane. Optionally, the positions of the first coil magnet pair and the second coil magnet pair can be staggered (that is, the positions of the first coil magnet pair and the second coil magnet pair can be asymmetrical with respect to the central axis of the second driving part), so that the driving force is provided to realize the rotation of the movable portion in the xoy plane (that is, the movement in the Rz direction).

Figure 34:
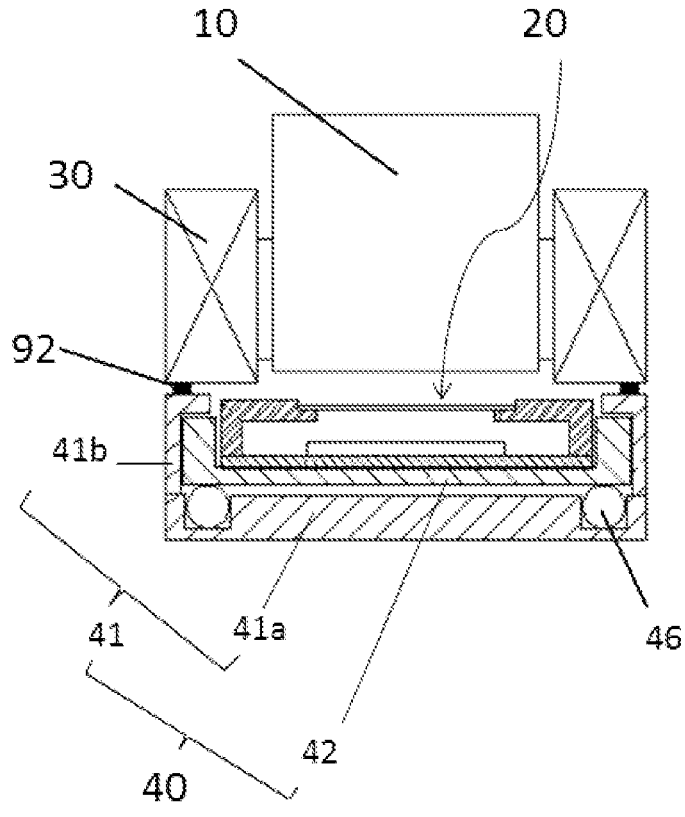
FIG. 34 is a schematic view illustrating an assembling manner of a camera module according to an embodiment of the present invention.

In more details, FIG. 34 is a schematic diagram illustrating an assembly method of the camera module in an embodiment of the present application. In this embodiment, optionally, the lens 10 is firstly installed on the first driving part 30, the photosensitive assembly 20 is installed on the second driving part 40, and then the relative position between the photosensitive assembly 20 and the lens 10 is adjusted through an active alignment process, and then the first driving part 30 and the second driving part 40 are bonded and fixed through a glue 92, so that the relative position of the bonded photosensitive assembly 20 and the lens 10 can be maintained at the relative position determined by the active alignment process. In this embodiment, for example, the glue 92 may be disposed between the base of the first driving part 30 and the base of the second driving part 40.

Figure 35A:
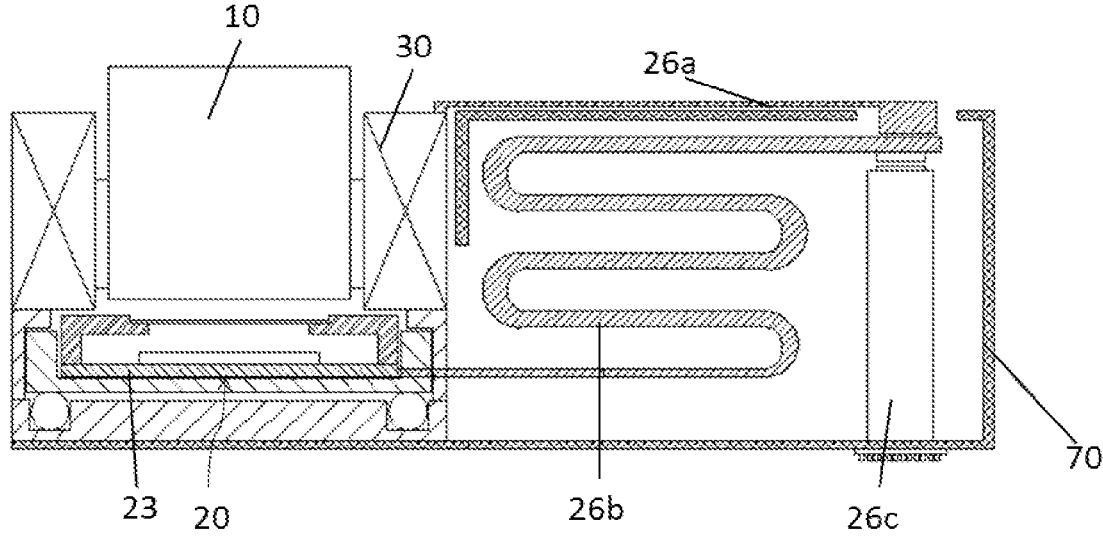
FIG. 35a is a schematic view illustrating the layout of a camera module and its connecting band according to an embodiment of the present invention.
Figure 35B:
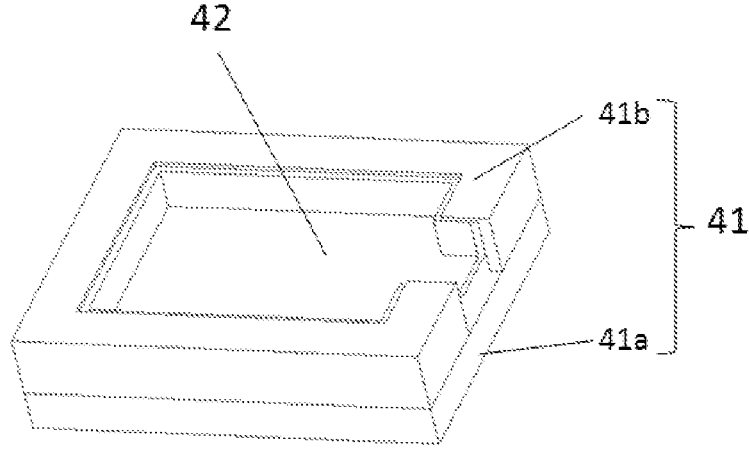
FIG. 35b is a perspective view illustrating a second driving part according to an embodiment of the present invention.

In addition, FIG. 35*a* is a schematic view illustrating the arrangement of the camera module and its connecting band in one embodiment of the present application. In this embodiment, the camera module may comprise a first connecting band 26*a* and a second connecting band 26*b*. The first connecting band 26*a* is arranged on the top of the first driving part 30 and is electrically connected to the first driving part 30. The second connecting band 26*b* communicates with the circuit board 23 of the photosensitive assembly 20. The second connecting band 26*b* can be provided with multiple bends to form a bent and laminated shape, so as to buffer the stress caused by the movement of the photosensitive assembly 20. And end of the second connecting band 26*b* can be provided with a connector, which is optionally fixed and electrically connected to an intermediate transfer column 26*c* by pressing, and then connected to the main board (or other components) of the terminal device through the intermediate transfer column 26*c*. Similarly, an end of the first connecting band 26*a* can also be connected to a connector, which can be fixed and electrically connected to the intermediate transfer column 26*c* by pressing, and then is conducted with the main board (or other components) of the terminal device through the intermediate transfer column 26*c*. In the solution of this embodiment, the conduction circuit of the first driving part 30 can be separated from the photosensitive assembly 20 and is not affected by the movement of the photosensitive assembly 20. The second connecting band 26*b* and the intermediate transfer column 26*c* can be accommodated in the second housing 70 (the second housing 70 can be a connecting band receiving housing), the first connecting band 26*a* is located outside the second housing 70, and a top of the second housing 70 may have a third through hole 70*a*, so that the connector of the first connecting band 26*a* can extend into and be in electrical connection with the second connecting band 26*b* or the intermediate transfer column 26*c*. In addition, FIG. 35*b* is a perspective view of the second driving part according to an embodiment of the present application. Referring to FIGS. 35*a* and 35*b*, it can be seen that in this embodiment, one side wall of the movable portion 42 and the base portion 41 has a slot or a window; so that the first connecting band passes through a side of the movable portion 42 and a side wall of the base portion 41.

In the above embodiments, the first driving part and the second driving part may constitute a dual optical image stabilization driving structure (also referred to as a dual OIS driving structure). In the driving structure, the first driving part is suitable for installing the lens, and the second driving part is suitable for installing the photosensitive assembly, and the lens and the photosensitive chip are configured to be driven simultaneously and move in opposite directions. For example, if the lens is driven to move in the positive direction of the x-axis, the photosensitive chip is driven to move in the negative direction of the x-axis; if the lens is driven to move in the positive direction of the y-axis, the photosensitive chip is driven to move in the negative direction of the y-axis; if the lens is driven to move in both the x-axis and y-axis, the photosensitive chip is driven to move in a direction opposite to the lens movement in the x-axis and y-axis. In other words, when it is necessary to move in the x-axis and y-axis at the same time, the displacement vector of the lens in the xoy plane and the displacement vector of the photosensitive chip are opposite. In some embodiments of the present application, the lens and the photosensitive chip are configured to move simultaneously, and the lens and the photosensitive chip move in opposite directions, which can achieve faster response and better optical image stabilization effect. In addition, usually the optical image stabilization angle range of the existing camera module is limited by the suspension system and the driving system, so that it is impossible to achieve a relatively large compensation angle range. However, in some embodiments of the present application, a large-angle shake compensation is realized by driving the lens and the photosensitive chip to move in the opposite directions simultaneously. In addition, compared with some optical image stabilization solutions in the prior art that only drive the lens to move, in some embodiments of the present application, by simultaneously driving the lens or/and the photosensitive chip to move in opposite directions, there is a larger stroke of relative movement (for ease of description, this stroke of relative movement may be referred to as optical image stabilization stroke for short) between the lens and the photosensitive chip, which can have a better compensation effect. In particular, due to the increase of the optical image stabilization stroke, the present application also has a better compensation effect on the tilt shaking of the camera module. Further, in some embodiments of the present application, the movement direction of the optical image stabilization movement can be limited in the xoy plane without tilting the optical axis of the lens or the photosensitive chip, thereby avoiding the blurring problem caused by the optical image stabilization movement.

The above description is only preferred embodiments of the present application and an illustration of the applied technical principle. Those skilled in the art should understand that the scope of the invention involved in this application is not limited to the technical solution formed by the specific combination of the above-mentioned technical features, but should also cover the technical solutions formed by the combination of the above-mentioned technical features or equivalent features without departing from the inventive concept, such as a technical solution formed by replacing the above-mentioned features with technical features with similar functions disclosed in (but not limited to) this application.

What is claimed is:

1. A driving structure for an optical actuator, comprising:
   a first driving part arranged for mounting a lens and driving the lens to translate in the directions of the x-axis and the y-axis, wherein the x-axis and y-axis are orthogonal to an optical axis of the lens; and
   a second driving part which is arranged for driving a photosensitive chip to translate in the x-axis and y-axis directions; wherein the lens and the photosensitive chip are configured to be driven simultaneously and move in opposite directions, wherein based on a detected tilt shaking angle a of a camera module, a lens movement distance of the lens which is driven by said first driving part is determined as b, and a movement distance of the photosensitive chip driven by said second driving part is determined as c, wherein the movement distance b of the lens, the movement distance c of the photosensitive chip, and an image focal length f of the camera module satisfy the following equation: $a=\arctan(b/f)+\arctan(c/f)$, wherein said driving structure further comprises a driving logic module having an anti-shake threshold K, wherein said driving logic module is arranged to keep a ratio between the movement distance b of the lens and the movement distance c of the photosensitive chip remain at a preset fixed ratio when the tilt shaking angle a is less than or equal to the anti-shake threshold K, and to allow the movement distance c of the photosensitive chip reaches the maximum value $c_{max}$ of a moving stroke when the tilt shaking angle a is greater than the anti-shake threshold K, and the movement distance b of the lens is calculated according to the following relationship equation: b=tan (a/f)$-c_{max}$.

2. A driving structure for an optical actuator, comprising:

a first driving part arranged for mounting a lens and driving the lens to translate in the directions of the x-axis and the y-axis, wherein the x-axis and y-axis are orthogonal to an optical axis of the lens; and a second driving part which is arranged for driving a photosensitive chip to translate in the x-axis and y-axis directions; wherein the lens and the photosensitive chip are configured to be driven simultaneously and move in opposite directions, wherein based on a detected tilt shaking angle a of a camera module, a lens movement distance of the lens which is driven by said first driving part is determined as b, and a movement distance of the photosensitive chip driven by said second driving part is determined as c, wherein the movement distance b of the lens, the movement distance c of the photosensitive chip, and an image focal length f of the camera module satisfy the following equation: a=arctan (b/f)+arctan (c/f), wherein said driving structure further comprises a driving logic module which is used to keep a ratio between the movement distance b of the lens and the movement distance c of the photosensitive chip remain at a preset fixed ratio.

3. The driving structure for an optical actuator according to claim 2, wherein the preset fixed ratio of the movement distance of the lens to the movement distance of the photosensitive chip is set based on a weight of the lens, a driving force of said first driving part, a weight of the photosensitive chip or the photosensitive assembly, and a driving force of said second driving part, so as to allow the time for the lens and the photosensitive chip to move to the respective optical image stabilization target positions be the same.

4. A driving structure for an optical actuator, comprising:

a first driving part arranged for mounting a lens and driving the lens to translate in the directions of the x-axis and the y-axis, wherein the x-axis and y-axis are orthogonal to an optical axis of the lens; and a second driving part which is arranged for driving a photosensitive chip to translate in the x-axis and y-axis directions, wherein the lens and the photosensitive chip are configured to be driven simultaneously and move in opposite directions, wherein said second driving part is arranged for being installed with a photosensitive assembly which comprises the photosensitive chip, and said second driving part passes drives the photosensitive assembly to move to realize the translation of the photosensitive chip in the x-axis and y-axis directions, wherein said first driving part comprises a first base portion and a first movable portion, and said second driving part comprises a second base portion and a second movable portion, wherein said second base portion is fixed with said first base portion, and said second movable portion is located below said second base portion and is movably connected to said second base portion, wherein said photosensitive assembly is located below said second movable portion and fixed to said second movable portion.

5. The driving structure for an optical actuator according to claim 4, wherein said second movable portion is movably connected with said second base portion through a ball, so as to provide ball-based suspension system to restrict a degree of freedom of movement of said second movable portion with respect to said second base portion within the xoy plane.

6. The driving structure for an optical actuator according to claim 5, wherein said driving structure further comprises a rear shell located below said second driving part, wherein said rear shell is connected to said second base to form an accommodating chamber, wherein said second movable portion and the photosensitive assembly are located in said accommodating chamber, wherein a gap is formed between said photosensitive assembly and a bottom of said rear shell.

7. The driving structure for an optical actuator according to claim 5, wherein said second base portion comprises a base and a cover, and said cover comprises a side wall extended downward from said base to surround said second movable portion and a supporting platform formed by extending horizontally inward from said side wall.

8. The driving structure for an optical actuator according to claim 7, wherein said ball and an edge region of said second movable portion are clamped between said base and said supporting platform.

9. The driving structure for an optical actuator according to claim 7, wherein an upper surface of said second base portion has a stepped structure, and said stepped structure comprises a first stepped surface on an outside and a second stepped surface on an inside, wherein a height of said second stepped surface is lower than a height of said first stepped surface.

10. The driving structure for an optical actuator according to claim 8, wherein an upper surface of an edge region of said second movable portion has a concave step which comprises an outer step surface and an inner step surface, and said outer step surface of the concave step is lower than said inner step surface, wherein said concave step together with said side wall of said cover and said base form a receiving chamber for receiving said ball.

11. The driving structure for an optical actuator according to claim 7, wherein said ball is located between said supporting platform and said second movable portion.

12. The driving structure for an optical actuator according to claim 7, wherein a layer of said ball is provided between said base and said second movable portion, while another layer of said ball is provided between said second movable portion and said supporting platform.

13. The driving structure for an optical actuator according to claim 7, wherein said second movable portion has a clamping groove indented from an outer surface thereof, and said supporting platform is fitted into said clamping groove.

14. The driving structure for an optical actuator according to claim 7, wherein a glue is disposed between a lower end surface of said second movable portion and an upper end surface of a lens holder of the photosensitive assembly, and said glue avoid four corners of said second movable portion.

15. The driving structure for an optical actuator according to claim 7, wherein said second driving part comprises a driving element which is a coil-magnet assembly which comprises a magnet arranged on an edge region of said second base portion, and a coil arranged on an edge area of said second movable portion; or said coil and said magnet are respectively arranged on side walls of said second movable portion and said second base portion.

16. The driving structure for an optical actuator according to claim 15, wherein the coil-magnet assembly comprises a first coil magnet pair, a second coil magnet pair and a third coil magnet pair, wherein said first coil magnet pair and said second coil magnet pair are used to provide a driving force in the x-axis direction, said third coil magnet pair is used to provide a driving force in the y-axis direction, wherein in a top view angle, said first coil magnet pair and said second coil magnet pair are respectively arranged along a first side and a second side of said second driving part, wherein the first side and the second side do not intersect, said third coil magnet pair is arranged along a third side of said second driving part, and the third side intersects with both the first side and the second side.

17. A camera module, comprising:

a lens;

a photosensitive assembly; and a driving structure for an optical actuator comprising a first driving part which is arranged for mounting a lens and driving the lens to translate in the directions of the x-axis and the y-axis and a second driving part which is arranged for driving a photosensitive chip to translate in the x-axis and y-axis directions, wherein the lens and the photosensitive chip are configured to be driven simultaneously and move in opposite directions, wherein the x-axis and y-axis are orthogonal to an optical axis of the lens, wherein said lens is installed on said first driving part, and said photosensitive assembly is installed on said second driving part, wherein said photosensitive assembly comprises a circuit board, and said camera module further comprises a first connecting band and a second connecting band, and said first connecting band is arranged on a top area of said first driving part and is electrically connected to said first driving part, and said second connecting band is connected and conducted with said circuit board of said photosensitive assembly, wherein said second connecting band is provided with multiple bends to form a curved stacked shape.

18. A camera module, comprising:

a lens;

a photosensitive assembly; and a driving structure for an optical actuator comprising a first driving part which is arranged for mounting a lens and driving the lens to translate in the directions of the x-axis and the y-axis and a second driving part which is arranged for driving a photosensitive chip to translate in the x-axis and y-axis directions, wherein the lens and the photosensitive chip are configured to be driven simultaneously and move in opposite directions, wherein the x-axis and y-axis are orthogonal to an optical axis of the lens, wherein said lens is installed on said first driving part, and said photosensitive assembly is installed on said second driving part, wherein said first driving part comprises a first base portion and a first movable portion, and said second driving part comprises a second base portion and a second movable portion, wherein said second base portion is fixed with said first base portion, said second movable portion is located below said second base portion and is movably connected with said second base portion, and said photosensitive assembly is located below said second movable portion and fixed to said second movable portion; wherein said photosensitive assembly comprises a suspended circuit board which comprises a rigid main body of said circuit board and flexible connecting bands, and said connecting bands are extended from a first side and a second side of said circuit board body and bent upward to form bent parts, and a top of said bent part extends along a periphery of said photosensitive assembly in a horizontal direction, so that said connecting bands surround the first side, the second side and the third side of the photosensitive assembly, wherein each of said connecting bands located on the first side, the second side and the third side comprises at least one suspending portion which is fixed to said second base portion of said second driving part, or is fixed to said second base portion through an intermediary, wherein said photosensitive assembly has a first side and a second side consistent with the position of said main body of said circuit board, and the first side and the second side are arranged oppositely, and the third side intersects both the first side and the second side.

19. The camera module according to claim 18, wherein said suspending portion has a suspension hole, said second base portion or said intermediary has a hook which is engaged with said suspension hole.

20. The camera module according to claim 18, wherein a part of each connecting band is attached with a rigid substrate for reinforcement, so as to form the suspending portion.

21. The camera module according to claim 18, wherein the suspended circuit board is made of a rigid-flex board, wherein the circuit board body and the suspending portion are made of a rigid board of the rigid-flex board and are partially formed, the bending part and the connecting band section connected between the plurality of suspending portions are formed by the flexible board part of the rigid-flex board.

22. The camera module according to claim 21, wherein said connecting bands comprises a third connecting band and a fourth connecting band, wherein said third connecting band is extending from said first side of said main body of said circuit board and bent upward to form a bending portion, then extending along said first side of said photosensitive assembly, and bending in the horizontal direction at said corner and continuing to extend along said third side, wherein said fourth connection band is extending from said second side of said main body of said circuit board and bent upward to form another bending portion, then extending along said second side of said photosensitive assembly, and bending horizontally at said corner and continuing extending along said third side, wherein said third connecting band and said fourth connecting band are joined at said third side and conducted with each other.

23. The camera module according to claim 22, wherein a fifth connecting band is connected to said suspending portion of said connecting band located at said third side, and said fifth connecting band comprises a connector, wherein said suspended circuit board also comprises a fixing portion for fixing said fifth connecting band.

* * * * *